United States Patent [19]
Witherspoon et al.

[11] Patent Number: 6,001,426
[45] Date of Patent: Dec. 14, 1999

[54] HIGH VELOCITY PULSED WIRE-ARC SPRAY

[75] Inventors: F. Douglas Witherspoon, Fairfax Station; Dennis W. Massey; Russell W. Kincaid, both of Manassas, all of Va.

[73] Assignee: Utron Inc., Manassas, Va.

[21] Appl. No.: 08/900,468

[22] Filed: Jul. 25, 1997

Related U.S. Application Data

[60] Provisional application No. 60/022,642, Jul. 25, 1996.

[51] Int. Cl.[6] ........................................................ B05D 1/08
[52] U.S. Cl. .................... 427/449; 427/539; 219/121.59; 219/121.47; 219/121.52; 219/76.15; 219/76.16
[58] Field of Search .......................... 219/121.59, 121.47, 219/121.52, 76.15, 76.16; 427/449, 539

[56] References Cited

U.S. PATENT DOCUMENTS

| | | |
|---|---|---|
| 3,212,914 | 10/1965 | Lyle et al. . |
| 3,312,566 | 4/1967 | Winzeler et al. ................. 219/121.47 |
| 4,142,089 | 2/1979 | Lau et al. . |
| 4,370,538 | 1/1983 | Browning ............................. 219/121.59 |
| 4,374,075 | 2/1983 | Yolton et al. . |
| 4,689,463 | 8/1987 | Shubert . |
| 4,715,261 | 12/1987 | Goldstein et al. . |
| 4,788,402 | 11/1988 | Browning ............................. 219/76.16 |
| 4,821,508 | 4/1989 | Burton et al. . |
| 4,821,509 | 4/1989 | Burton et al. . |
| 4,948,485 | 8/1990 | Wallsten et al. ...................... 204/164 |
| 4,974,487 | 12/1990 | Goldstein et al. . |
| 4,990,739 | 2/1991 | Zaplatynsky ........................ 219/121.47 |
| 5,206,059 | 4/1993 | Marantz . |
| 5,262,206 | 11/1993 | Rangaswamy et al. . |
| 5,296,667 | 3/1994 | Marantz et al. .................... 219/121.47 |
| 5,374,802 | 12/1994 | Dorfman et al. ................... 219/121.52 |
| 5,425,231 | 6/1995 | Burton . |
| 5,442,153 | 8/1995 | Marantz et al. . |
| 5,451,740 | 9/1995 | Hanus et al. ........................ 219/121.59 |

FOREIGN PATENT DOCUMENTS

| | | |
|---|---|---|
| 0232594 | 11/1986 | European Pat. Off. . |

OTHER PUBLICATIONS

Fleischer, D., "Ceramic Insulators for Pulsed Electrothermal Discharges," Contract No. DNA001–86–C–0072, Jan. 30, 1987.

Burton, R.L., "Ceramic Insulators for Pulsed Electrothermal Devices," NASA Contract No. NAS 3–25272, May 25, 1989.

Shapiro, A.H., "The Dynamics and Thermodynamics of Compressible Fluid Flow," pp. 73–105, John Wiley & Sons, vol. 1.

Burton, R.L., et al., "Energy–Mass Coupling in High–Pressure Liquid–Injected Arcs," IEEE Transactions on Plasma Science, vol. 19, No. 2, Apr. 1991.

Uryukov, B.A., et al., "Application of Coatings Using Pulsed Plasma Flows," Surfaces and Coatings Tech., pp. 7–11, No. 48, 1991.

Longo, F.N., "Industrial Guide–Markets, Materials, and Applications for Thermal–Sprayed Coatings," Journal of Thermal Spray Tech., vol. 1(2), pp. 143–145, Jun. 1992.

(List continued on next page.)

*Primary Examiner*—Mark Paschall
*Attorney, Agent, or Firm*—James Creighton Wray; Meera P. Narasimhan

[57] ABSTRACT

Wire arc spraying using repetitively pulsed, high temperature gas jets, usually referred to as plasma jets, and generated by capillary discharges, substantially increases the velocity of atomized and entrained molten droplets. The quality of coatings produced is improved by increasing the velocity with which coating particles impact the coated surface. The effectiveness of wire-arc spraying is improved by replacing the usual atomizing air stream with a rapidly pulsed high velocity plasma jet. Pulsed power provides higher coating particle velocities leading to improved coatings. 50 micron aluminum droplets with velocities of 1500 m/s are produced. Pulsed plasma jet spraying provides the means to coat the insides of pipes, tubes, and engine block cylinders with very high velocity droplet impact.

46 Claims, 22 Drawing Sheets

OTHER PUBLICATIONS

Goldstein, S.A., et al., "Electric Cartridge Guns Using Fluids Heated by a Capillary Plasma Jet," GTD Report No. 83–11, Sep. 1983.

Burton, R.L., et al., "EMET Technology for Rail Launches," IEEE Transactions on Magnetics, vol. MAG–22, No. 6, pp. 1410–1415, Nov. 1986.

Witherspoon, F.D., et al., "GEDI EMET Railgun Experiments at GT–Devices," Contractor Report ARFS–D–CR–91018, Nov. 1991.

Rizkalla, O.F., et al., "High–Pressure Hypervelocity Electrothermal Wind–Tunnel Performance Study and Subscale Tests," Journal of Propulsion and Power, pp. 731–738, vol. 9, No. 5, Sep.–Oct. 1993.

Witherspoon, F.D., et al., "Mach 10 to 20 Electrothermal Wind Tunnel Feasibility Study and Demonstration," Contract NASI–18450, Nov. 1991.

Brown, Alan S., "Spraying for Strength," Aerospace America, pp. 52–53, Jan. 1992.

Thorpe, M.L., et al., "A Pragmatic Analysis and Comparison of HVOF Processes," Journal of Thermal Spray Tech., vol. 1(2), pp. 161–170, Jun. 1992.

Thorpe, Merle L., "Thermal Spray Industry," Advanced Materials & Processes, pp. 50–61, May 1993.

Call, T., et al., "Protecting the Infrastructure with Thermal Spray Coatings–Technical Note," Journal of Thermal Spray Tech., vol. 2(4), pp. 323–327, Dec. 1993.

Neiser, R.A., et al., "Wire Melting and Droplet Atomization in a HVOF Jet," NTSC Proceedings, pp. 99–104, Sep. 1995.

Meyer, W.B., "Metal Spraying in the U.S.: A JTST Historical Paper," Journal of Thermal Spray, vol. 5(1), pp. 79–83, Mar. 1996.

Kowalsky, K.A., et al., "Characterization of Coatings Produced by the Wire–Arc–Plasma Spray Process", NTSC Proceedings, pp. 389–394, May 1991.

Steffens, H.–D., et al., "Recent Developments in Single–Wire Vacuum Arc Spraying," Journal of Thermal Spray, vol. 3(4), pp. 412–417, Dec. 1994.

Shcolnikov, E.Ya., et al., "Acceleration of Powder Materials in an Electrothermal Launcher," IEEE Transactions on Magnetics, vol. 31, No. 1, pp. 758–763, Jan. 1995.

Scholl, M., "Plasma Spraying with Wire Feedstock," NTSC Proceedings, pp. 491–496, Jun. 1994.

Steffens, H.–D., et al., "The Sonarc Process: Combining the Advantages of Arc and HVOF Spraying," Journal of Thermal Spray, vol. 3(4), pp. 398–403, Dec. 1994.

Sampson, E.R., "The Economics of Arc. vs. Plasma Spray for Aircraft Components," NTSC Proceedings, Jun. 1993.

Byrnes, L., et al., "Method and Apparatus for the Application of Thermal Spray Coatings onto Aluminum Engine Cylinder Bores," NTSC Proceedings, Jun. 1994.

Longo, F.N., "Industrial Guide–Markets, Materials, and Applications for Thermal–Sprayed Coatings," Journal of Thermal Spray Tech., vol. 1(2), pp. 143–145, Jun. 1992.

Berndt, C.C., et al., "Current Problems in Plasma Spray Processing," Journal of Thermal Spray Technology, vol. 1(4), pp. 341–356, Dec. 1992.

Steffens, H.–D., et al., "Recent Developments in Arc Spraying," IEEE Transactions on Plasma Science, vol. 18, No. 6, Dec. 1990.

Steffens, H.D., et al., "One Wire Vacuum Arc Spraying—A New Modified Process," NTSC Proceedings, pp. 395–398, May 1991.

Marantz, D.R., et al., "Wire–Arc Plasma Spray Process–Basic Principles and Its Versatility," NTSC Proceedings, pp. 381–387, May 1991.

H. Herman, "Plasma–sprayed Coatings," Scientific American, pp. 112–117, Sep. 1988.

Burton, R.L., et al., "Experiments on a Repetitively Pulsed Electrothermal Thruster," J. Propulsion and Power, vol. 6, No. 2, p. 139, 1990.

Marantz, David R., et al., "State of the Art Arc Spray Technology," NTSC Proceedings, pp. 113–118, May 1990.

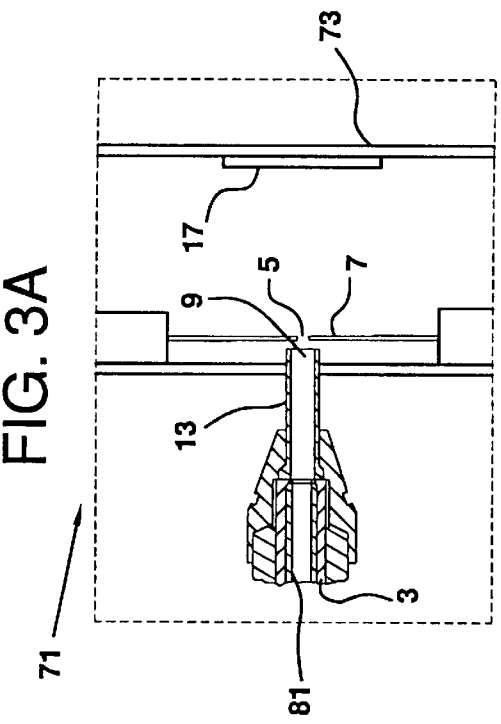
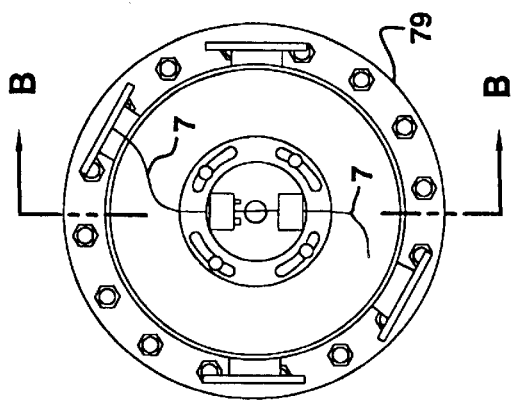
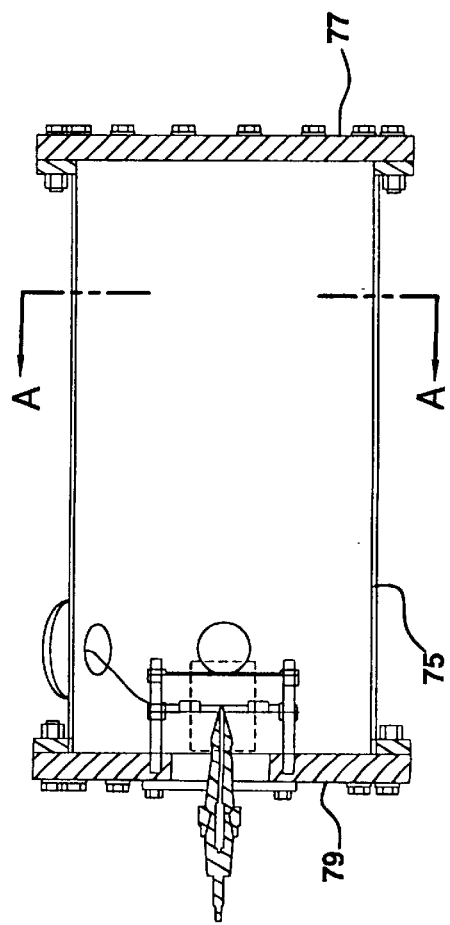

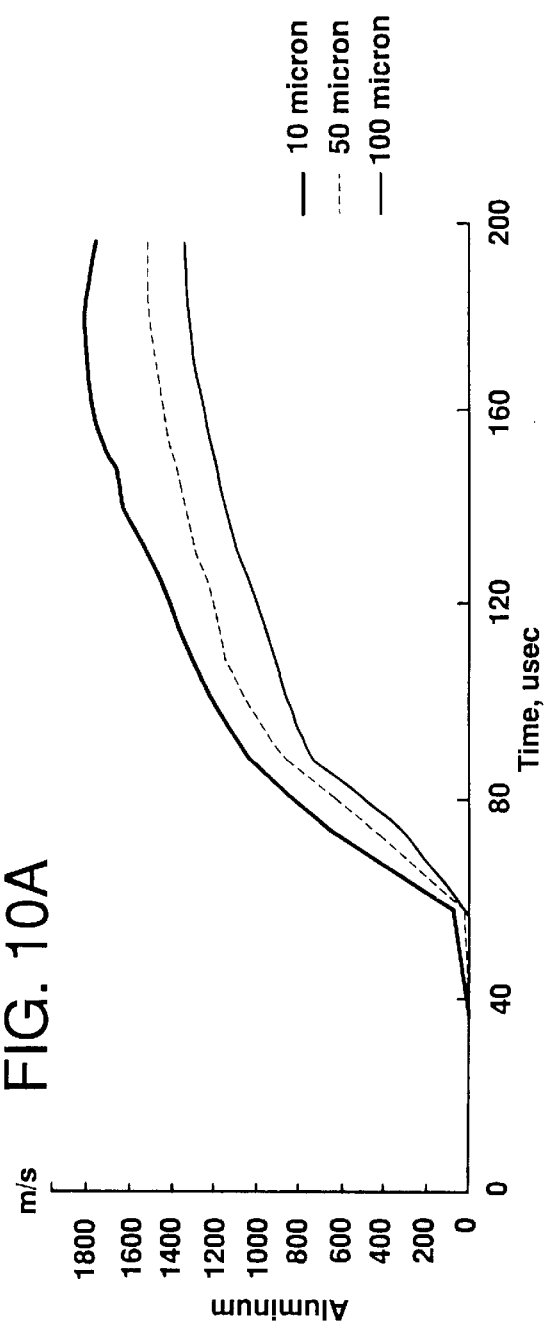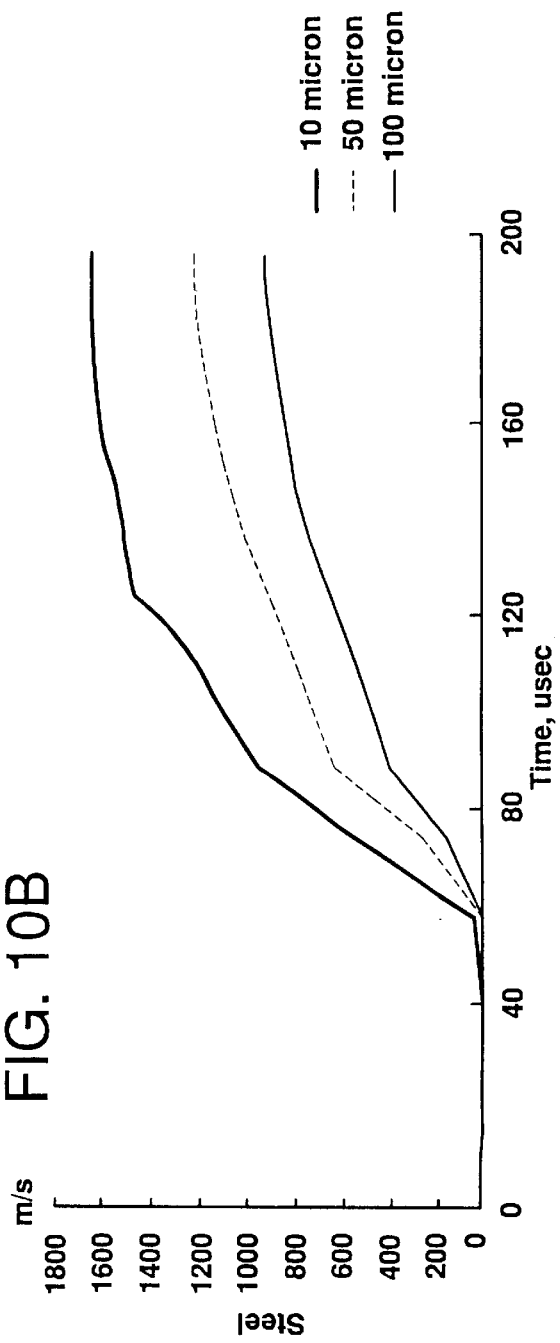

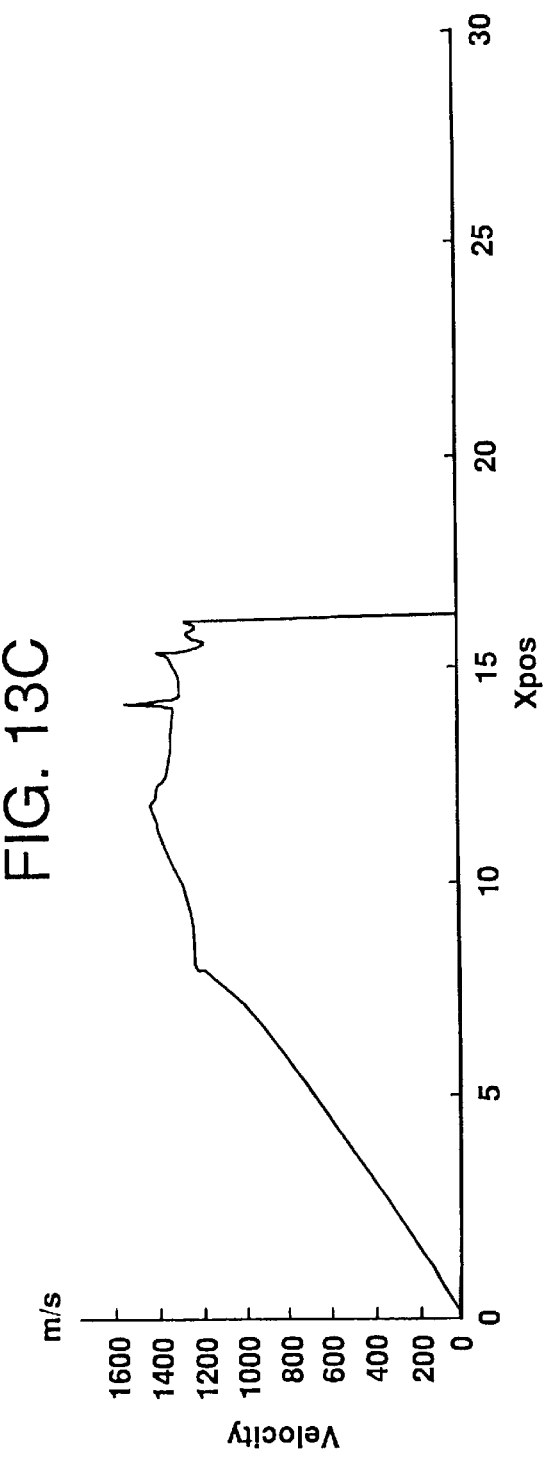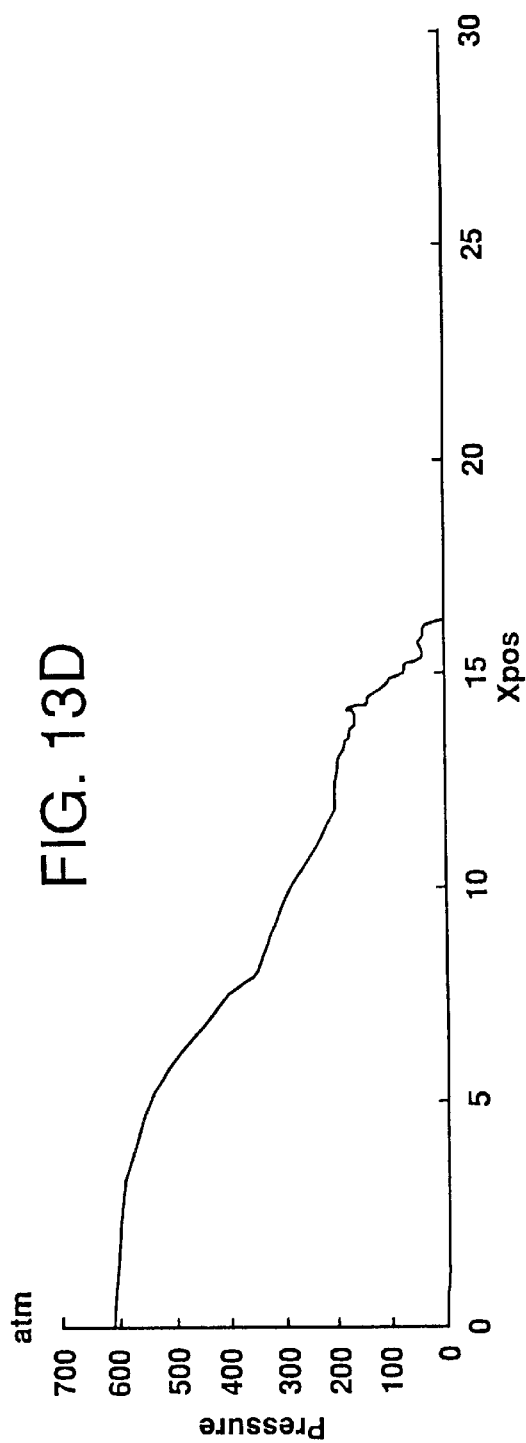

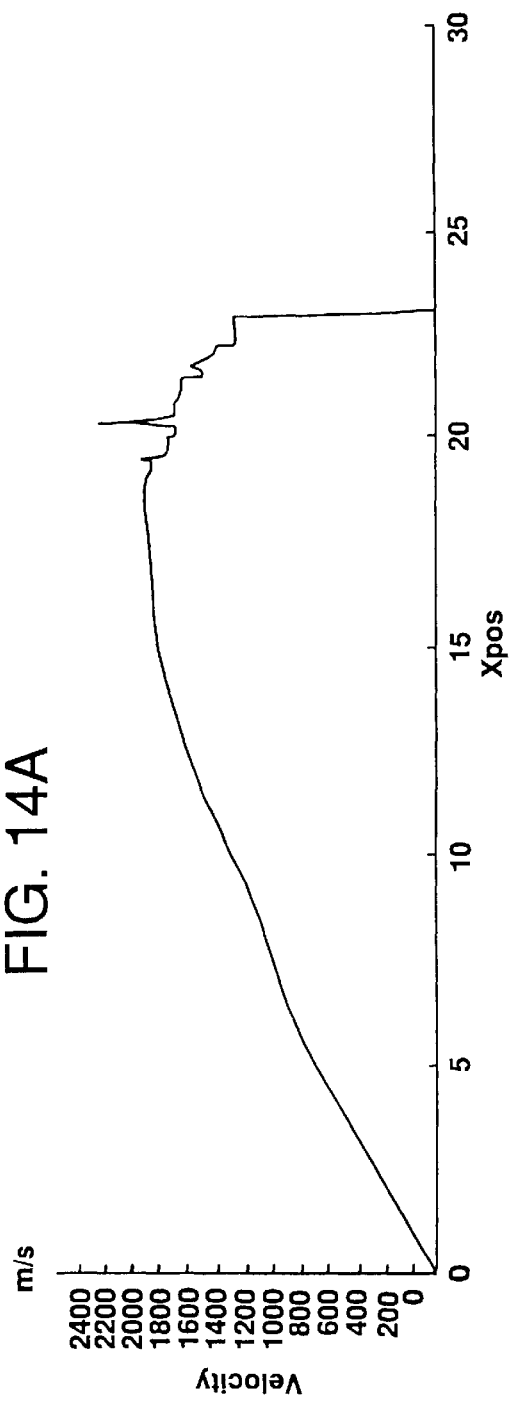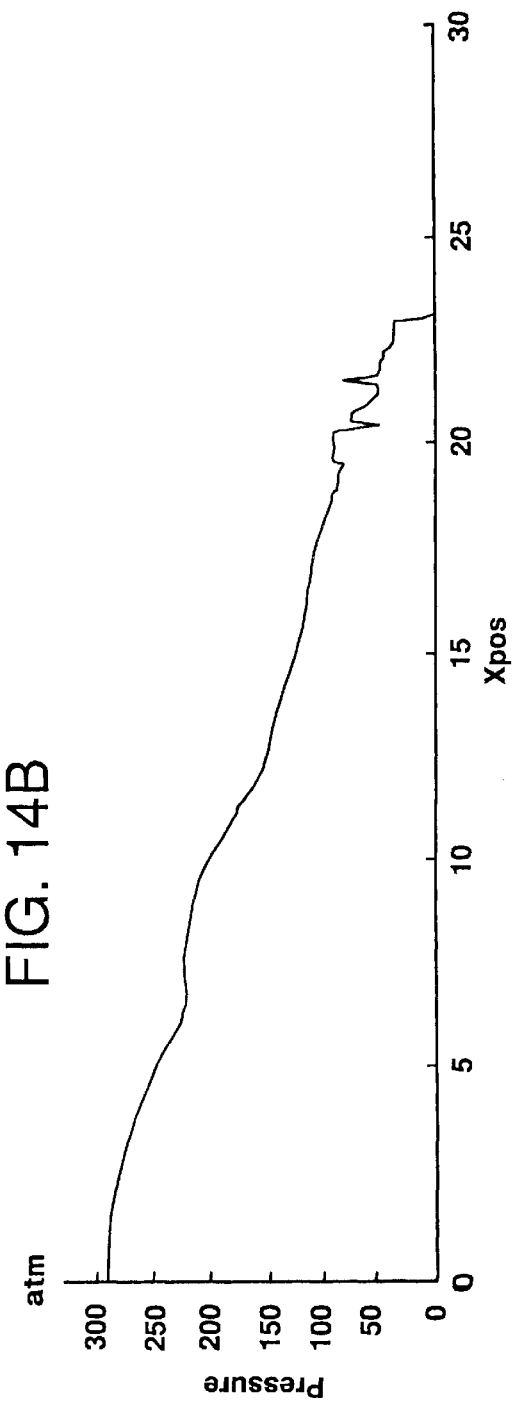

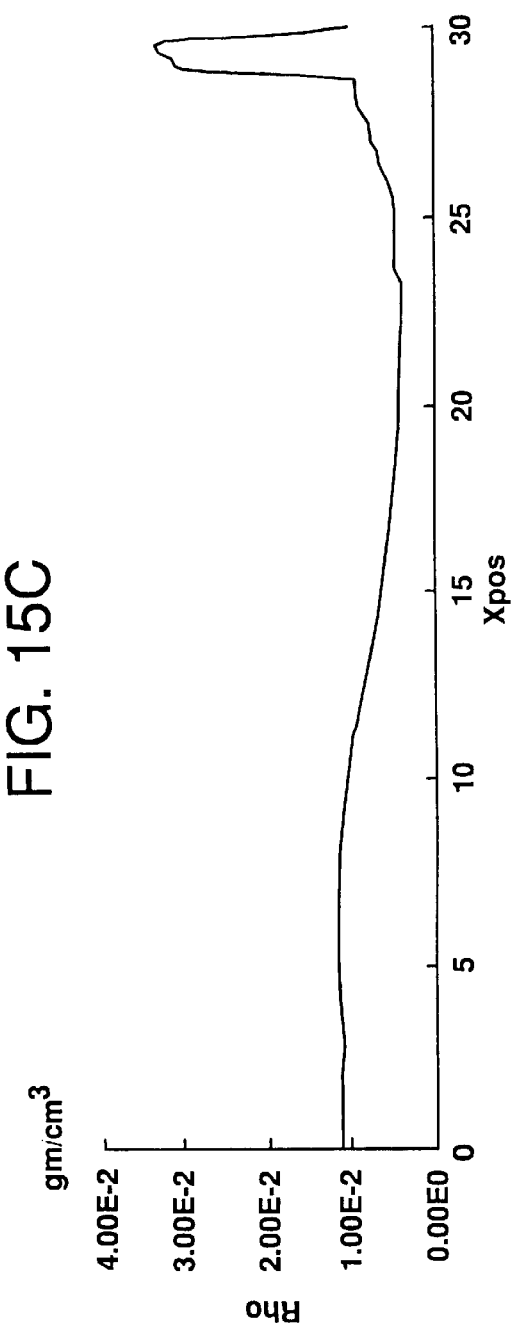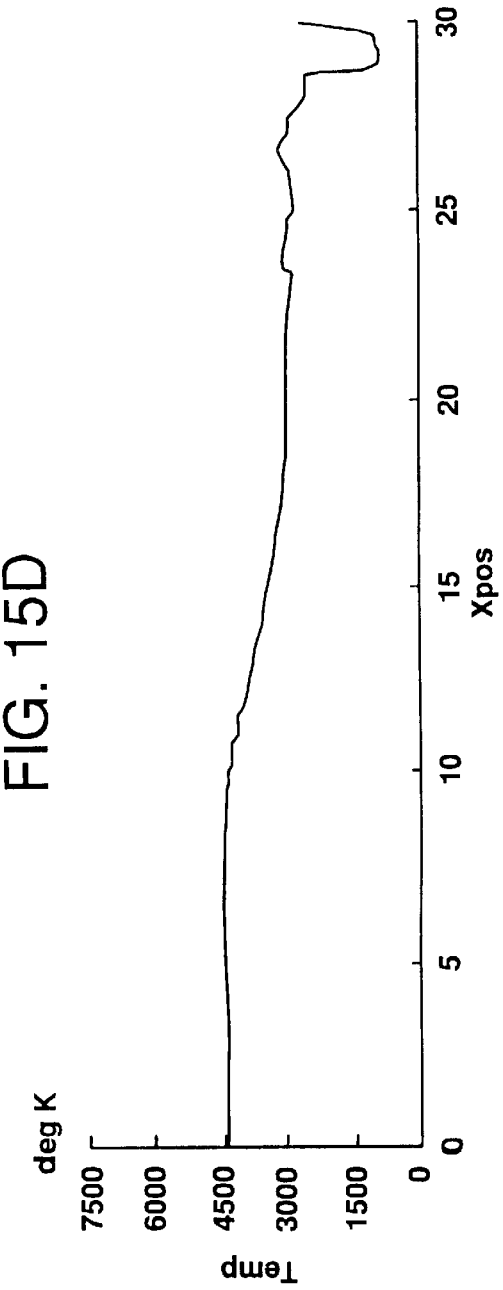

HIGH VELOCITY PULSED WIRE-ARC SPRAY

This application claims the benefit of U.S. Provisional Application No. 60/022,642 filed Jul. 25, 1996.

This invention was made with Government support under contract NAS8-40694 awarded by NASA. The Government has certain rights in this invention.

BACKGROUND OF THE INVENTION

Thermal spraying is a process of applying coatings of high performance materials, such as metals, alloys, ceramics, cermets and carbides, onto more easily worked and cheaper base materials. The purpose of the coating is to provide enhanced surface properties to the cheaper bulk material of which the part is made. Because of its ability to deposit virtually any material (and many combinations of materials) thermal spray has a wide and growing range of applications.

Coatings are a pervasive technology, permeating throughout all of industry and high technology applications. Coating technology is an enhancing technology that improves products and reduces cost. In many applications, coatings make it possible to achieve ends that cannot be achieved in any other known way, or at least in any way that is affordable. Examples of applications in different technologies are shown in Table 1.

Coatings are most easily grouped according to their primary function, as listed in Table 2. However, a given coating can often provide more than one of these basic functions. Some important applications are for thermal insulation, wear resistance, corrosion and chemical resistance, abradable and abrasive coatings, electrically conductive or resistive coatings, medically compatible coatings, dimensional restorative coatings, and polymer coatings. Recently, there has been strong interest in net shape spray forming techniques.

Specific applications range from thermal barrier coatings in gas turbines, to protective coatings for rocket nozzles, to internal combustion engine components such as piston rings, to newer applications in the prosthetic device area, to hardfacing load bearing surfaces, to anti-corrosion coatings on bridges and other infrastructure, to literally hundreds of others. Fabrication of ceramic substrates for electronic circuits by thermal spray techniques has long been considered, but is not yet widely accepted. This situation is expected to improve with the availability of improved spray processes which provide denser coatings with more uniform (homogeneous) and more resistive coatings. Table 1 lists many of the existing application areas for thermal spray coatings.

Dimensional restoration of worn landing gear assemblies is a potential market for advanced thermal spray technology. Currently, the quality of available thermal spray coatings is not sufficient for the FAA to approve the process for restoration of these and other critical aircraft assemblies. The potential to achieve true metallurgical bonding at high velocity holds the promise of acceptance of thermal spray repairs for these assemblies, opening up a large new market that does not now exist.

Thermal spray includes a variety of approaches, but can be grouped into three main coating processes: combustion, wire-arc, and plasma. Each particular approach has advantages and disadvantages that tend to position it in a particular area or areas of application. These include (in roughly ascending order of coating quality and with particle impact velocities listed in parenthesis): flame spray (30 m/s), flame wire spray (180 m/s), wire-arc spray (240 m/s), conventional plasma spray (240 m/s), detonation gun (910–1200 m/s), high-velocity oxyfuel (HVOF) (610–1200 m/s), high-energy plasma (240–1220 m/s) and vacuum plasma (240–610 m/s).

Thermal spray techniques can be further subdivided into continuous and detonation processes. Most approaches involve continuous processes. The detonation gun, marketed for years by Union Carbide under the trade name D-Gun® and more recently by Praxair, is the most notable exception. A recent variant on the D-Gun® is the DEMETON gun being marketed by a Russian firm in the U.S. Recent improvements in HVOF spray make it competitive with D-Gun® applied coatings in some applications. HVOF coating quality is roughly comparable to that of the D-Gun®.

Existing thermal spray processes are compared in Table 3.

Thermal spray has a rich history, but there is considerable room for improvement in the technology. There are substantial limitations in present thermal spray technology which have slowed or prevented expansion of existing markets and penetration into new markets and new application areas. The quality of coatings produced by present thermal spray technology and its economic viability is limited by a variety of factors including the following:

- A need exists for higher particle impact velocity, which generally produces better coatings.
- More uniformity of spray pattern is needed. More uniform spatial & temporal velocity distribution desired.
- Sensitivity to feedstock materials and other process variables are experienced.
- More efficient use of the energy is needed to melt coating materials.
- Deposition efficiencies are less than 50% for some materials.
- Coating properties are not yet equivalent to those of wrought material.
- Cost of newer high-performance materials is relatively high.
- Improved coating consistency & reproducibility are needed.
- More reliable equipment is needed.
- Higher spray rates are generally desirable.
- No industry standards exist for spray guns, and few for coating materials. No coating can be considered generic and reproducible at this time, partly due to the inability to accurately model existing systems.

High quality coatings are "generally" characterized by high adhesion and cohesion strengths, low porosity, low oxide inclusions (except for some cases where the phases are small and well dispersed), high hardness, and other properties designed for specific applications such as electrical or magnetic properties, or machinability for finishing.

Particle impact velocity is one of the most important factors in coating quality. One of the main areas of research and innovation in the industry has been the quest for ever higher velocities. Higher velocity impact generally produces denser, harder, and more uniform coatings with less porosity and with higher adhesion and cohesion. Porosity is the largest source of coating failure and is usually indicative of poor coating cohesion and a high degree of unmelted or cold-particle entrapment. High velocity impact forces splats to fill in voids, and the kinetic energy which is converted to heat during the impact reduces the number of unmelted particles, which reduces porosity. Oblique spraying, off perpendicular, should be significantly improved by high velocity, through reduction of shadow porosity effects. In addition, higher velocity tends to produce coatings with less induced stresses.

Ideal characteristics of the plasma spray process are uniform and controllable velocity of particles on impact, sufficient velocity to produce a high density deposit without "exploding" the molten or partially molten droplets on impact, uniform and controllable heating of particles, attainment of fully molten or plastic particles without vaporization or undesired reactions, isolation from or controlled interaction with the ambient environment, and stable process conditions with highly reproducible results.

Despite the limitations of present thermal spray systems, a $2B market has developed over the years. Penetration of thermal spray technology into new application areas, such as the automotive industry and electronics is, however, fundamentally constrained by the limitations in the existing technology as described above. The highest quality coatings are also the most difficult to make due to the high temperatures required to melt the powder materials and the high density of the powders such as the refractory metal alloys. Existing thermal spray technologies must work very hard to achieve the velocities now being produced. A contributing factor is the difficulty of controlling the chemical environment and generally preventing oxidation reactions from occurring on the surface of the powder particles prior to impact on the substrate. All of these factors effect coating quality. New applications and expanded markets for existing applications are expected to occur in the industry if dramatic improvements in performance of the technology are introduced and if costs can be reduced significantly.

Wire-arc spraying is a well established segment of the thermal spray market which is used primarily for producing corrosion and wear protection coatings. It is one of the most efficient methods of producing thick coatings. In the two-wire arc process, two insulated metallic wire electrodes are continuously fed to an arc point where a continuously flowing gas stream is used to atomize and spray the molten electrode material in the arc. Some configurations utilize a single feed wire and a non-consumable electrode.

Wire-arc spraying has several advantages over other thermal spray techniques. It produces a high spray rate. The process is energy efficient since all input energy is used to melt the metal. Energy efficiency also means typically lower substrate temperatures. Wire-arc spraying is generally simpler to operate. Equipment is relatively low in cost; and safety is enhanced by eliminating combustible gases. These advantages are counter-balanced by the fact that only non-brittle metallic wires may be used, which generally limits the materials that can be sprayed. In addition, atmospheric operation produces considerable noise and UV and infrared radiation which introduce safety hazards. The use of cored wires allows the introduction of alloys and other materials such as ceramics into the spray. Characteristic arc spraying parameters are shown in Table 4.

The metal droplets are already molten when they come off the wire tips, and so the primary function of the gas flow is to simply atomize and accelerate the molten droplets towards the substrate. However, the air flow begins cooling the molten droplets immediately after leaving the arc zone. Thus wire-arc spray devices attempt to minimize the flight time to reduce this cooling effect in order to ensure the particles are still molten on impact. This places an additional limitation on the velocity the particles can attain. The use of air to accelerate the molten droplets can also lead to undesirable surface oxidation. Needs exist for improved thermal coating apparatus methods and products.

SUMMARY OF THE INVENTION

The quality of coatings produced by virtually all thermal spray techniques could be improved by, among other things, increasing the velocity with which coating particles impact the coated surface and by controlling the chemical and thermal environment experienced by the particles during acceleration and flight. A new and innovative approach to thermal plasma spraying called Pulsed Wire Arc Spray (PWAS) can dramatically increase coating particle velocities while simultaneously controlling the chemical and thermal environment of the particles and maintaining the high deposition rates characteristic of conventional wire arc spray. PWAS should be able to obtain coating quality comparable to or better than those produced by plasma spray and HVOF, but with significantly reduced average thermal flux to the substrate, lower total power, and lower cost.

Restoration of landing gear is a strong contender for an early niche market for Pulsed Wire Arc Spray (PWAS), since it is a very high value added service that cannot be achieved with any other known thermal spray process. The savings to the airline industry would be millions of dollars annually. The same would be true for heavy equipment users.

NASA (and the aerospace community in general) is interested in using new lightweight graphite-epoxy composite tanks for liquid oxygen (LOX) storage tanks in next generation launchers. However, LOX is currently considered incompatible with the composite, and so a liner of some kind must prevent the LOX from coming into direct contact with the composite. This is currently solved with thin stainless steel liners bonded to the inner wall of the tank. Wire arc sprayed metallic coatings have been considered as a lower weight alternative, but wire arc spray does not produce sufficiently low porosity to prevent oxygen migration through the interconnected micro-porosity of the coating. This porosity is generally a result of the low impact velocity of the molten droplets. Plasma spray and HVOF could achieve the impact velocity required but have too large a thermal flux to the surface. Pulsed Wire Arc Spray can deliver the required impact velocity for this application with greatly reduced thermal flux.

An even larger potential market for Pulsed Wire Arc Spray is replacing iron liners in future aluminum engine block cylinders. PWAS has the capability of achieving its high velocities in only 2–3 cm. Adapting the PWAS to a small in-bore spray device should be able to spray iron at velocities of >500 m/s inside cylinders of 3 inch diameter and possibly less.

The High Velocity Pulsed Wire Arc Spray process deliberately uses a repetitively pulsed plasma jet generated by a capillary arc discharge at high stagnation pressure (>100 MPa or 15,000 psi) and high temperature (>10,000 K). These plasma jets can be used in a variety of ways to melt and accelerate coating materials, both in powder form and in wire form. The invention dramatically improves the effectiveness of traditional wire-arc spraying by replacing the conventional atomizing air stream with a rapidly pulsed plasma jet. Higher coating particle velocities are thereby obtained, due to a simultaneous increase in both gas velocity and gas density, and due to finer atomization of the molten droplets. The chemical and thermal environment of the molten droplets is improved through the use of inert gas. Conventional wire arc spray produces droplet velocities of only 100–300 m/s. Simulations show that PWAS can produce velocities well above 1500 m/s. When operated at velocities comparable to existing plasma spray and HVOF, significantly reduced average thermal flux to the substrate, lower total power, and lower cost should result. PWAS can operate either in atmosphere or in vacuum.

For many years, the use of pulsed plasma discharges has been studied for applications in rocket thrusters, wind tunnels, and to accelerate macroparticles (i.e. projectiles of mass>1 gm) to hypervelocity. These capillary discharges readily produce conditions of high pressure, high temperature, high velocity gas (plasma) flow which are exactly what is desired for heating and accelerating either powder particles or molten droplets generated in wire arcs. The trick is how to harness this source of heat and pressure to do useful work. In a single-shot mode, as is the case for ET guns, the discharges can be designed to melt anything and to accelerate small particles or droplets to velocities easily exceeding 10 km/s in vacuum. Even 2 gram macroparticles have been accelerated to above 7 km/s in the electric light gas gun. But such single-shot devices use disposable ablative plastic liners, making them of no utility for a commercially viable thermal spray device. The main issue then is how to make this technology repetitive in order to make use of the high pressure and high temperature (i.e. high enthalpy) that is available in the capillary discharge.

The capillary discharge has been used at energies from below 1 joule to above 1 Megajoule, at instantaneous power levels from 100 kW to 1 GW. Pressure levels from 10 to 10,000 atmospheres have been achieved. This versatile device has a number of distinct advantages that make it ideal for generating the required high velocity gas flows, and has been developed over the past decade for applications in defense, space, and energy. Capillary discharges find some specific applications for accelerating masses in electrothermal (ET) guns or for producing rocket thrust in the Pulsed ElectroThermal (PET) thruster The basic capillary discharge device with ablative liner is illustrated in FIG. 18. It consists of a long, narrow discharge channel comprised of an insulating wall with electrodes at either end. One end, usually the cathode, is closed off to contain the pressure generated by the discharge. The anode end is formed by an annular electrode, with an inner diameter that may sometimes be smaller than the capillary (forming a throat), through which the discharge plasma flows. The capillary electrodes are fabricated of typical high performance electrode materials such as tungsten, thoriated tungsten, graphite, copper alloys, or other advanced electrode materials designed for low erosion. Careful operational tailoring and optimization will be required to maximize electrode lifetimes.

The single-shot capillary discharge chamber typically uses an ablative plastic liner to provide the working fluid (through ablation of the wall material), but repetitive systems can be (and have been) designed which utilize non-ablative ceramic walls and injection of a working fluid. The capillary is then driven with a short electrical pulse, anywhere from 10's of $\mu$sec to 2–3 msec in length, usually from a capacitive Pulse Forming Network (PFN). The length and diameter of the capillary are chosen so as to create the desired temperature of the gas in the capillary (for the given pressure), which is heated and ionized by the discharge, forming a plasma. This temperature, combined with the capillary geometry, creates an electrical resistance, which is matched to the impedance of the PFN. As is well known, under matched conditions the stored energy is efficiently transferred from the PFN to the discharge load in a single pulse. Typically, the discharge resistance is designed to be high—0.1 to 1.0 ohms. Since the parasitic resistance of the transmission circuit and the PFN is typically small, a few milliohms, most of the PFN energy is transferred to the discharge. Transfer efficiencies of >99% are not uncommon.

Ceramics have essentially no tensile strength and so the ceramic tube is contained in a heat shrunk steel jacket which prestresses the ceramic so that it is always in compression even during the discharge.

The working mass can also be introduced either as a liquid or as a gas, as opposed to relying on wall ablation. Irrespective of how the working fluid is introduced, once the discharge energy has been transferred to the inside of the capillary in the form of hot gas enthalpy, the capillary acts much like the combustion chamber of a pulsed rocket. The time for the heated gas to flow out of the capillary is controlled by the diameter of the anode throat, d*. For $d^*=d_{capillary}$, the flow time in a vacuum is given by $2L/c_s$, where L is the capillary length and $c_s$ is the sound speed. For L=10 cm and $c_s$=2000 m/s, the time is 100 $\mu$sec. For $d^*<d_{capillary}$, the flow time can be up to ten times longer.

Capillary discharges operate at high pressures, and this feature can be used to great advantage in a thermal spray scheme, since the capillary discharge approach to thermal spray provides a means of achieving high pressure and high temperature, while at the same time achieving high mass density, something impossible to achieve in conventional plasma spray or combustion spray processes (including the D-Gun®).

Most thermal spray devices operate in a continuous mode, but historically, the D-Gun® has demonstrated that pulsed thermal spray devices can produce coatings of superior quality. The D-Gun® really established the thermal spray industry for advanced aerospace applications in the 1950's. However, the D-Gun® is limited in the pressures and temperatures attainable due to the combustion process used. Pulsed plasma discharges, on the other hand, can produce pressures and temperatures limited only by the material strength of the containment vessel. For instance, capillary discharge pressures up to nearly 690 MPa (100,000 psi) are routinely generated in electrothermal accelerators. Pulsed plasma discharges can produce gas flow velocities well above those produced by existing thermal spray devices, easily exceeding 20 km/s in vacuum for conditions of interest to thermal spray applications. These capabilities are ideal for accelerating and heating powder particles or wire-arc formed droplets. Thermal spray devices based on repetitively operated pulsed plasma discharges can produce particle impact velocities of several km/s, as opposed to the maximum of 1.2 km/s typically achieved by existing detonation guns and High Velocity Oxy-Fuel (HVOF) sprays for only the smallest particles (10 $\mu$m).

One of the most widely used thermal spray technologies is wire arc spray. One principal disadvantage of the wire-arc spray technique is the low particle velocity obtained, generally limited to about 250 mn/s. If the particle velocities obtained from wire-arc spray could be significantly increased without detracting from its other advantages, then generally superior quality coatings could be obtained. This would be of real interest for anti-corrosion coatings which need dense, hard, void-free coatings. The velocity limit is simply a result of the method used to atomize and accelerate the molten droplets, typically using just compressed air.

Pulsed Wire Arc Spraying uses the technology of pulsed plasma jets to substantially increase the particle velocity of wire-arc spray devices, while maintaining the high deposition rates of conventional wire arc spray. The usual compressed air supply is replaced with a pulsed plasma jet. The capillary is oriented such that the jet aims directly through the arc between the wire electrodes, just as for compressed air. The high velocity jet accelerates the molten particles to much higher velocity than compressed air. The high gas density and gas velocity in the plasma jet (i.e. the higher $\rho_{gas}v_{gas}^2$) also provides more effective atomization of the molten droplets, producing smaller atomized droplet sizes which are more easily accelerated to higher velocity.

The wire arc can be formed in a conventional manner and energized by a typical arc welder-like power supply. In one configuration, the plasma jet begins pulsing immediately after arc initiation with the minimum time between pulses determined by the rate at which the arc re-establishes itself. To re-establish the arc in the afterglow of the jet uses a relatively low voltage arc welder power supply.

In a more efficient and controllable method of operation, the dc power supply for the wire arc is replaced by a smaller version of the pulse forming network powering the plasma jet. The wire arc operates in a pulsed manner, with a precisely tailored energy and pulse width delivered to the wire arc electrodes in each pulse. The wire-arc discharge and the plasma jet discharge occur essentially simultaneously. Several specific advantages of pulsing the wire arc discharge over a dc powered wire-arc system are detailed in Table 6.

These and further and other objects and features of the invention are apparent in the disclosure, which includes the above and ongoing written specification, with the claims and the drawings.

BRIEF DESCRIPTION OF THE TABLES AND DRAWINGS

Table 1 shows examples of existing application areas for thermal spray coatings.

Table 2 lists the major functions of thermal spray coatings.

Table 3 compares existing thermal spray processes.

Table 4 shows conventional wire-arc spraying characteristics.

Table 5 lists typical applications and materials for wire-arc spraying.

Table 6 details specific advantages of using pulsed wire-arc operation in conjunction with a pulsed plasma jet, over dc wire arc operation in conjunction with a pulsed plasma jet.

Table 7 summarizes approximate PWAS operating parameters for one particular example.

Table 8 shows technical advantages and drawbacks of PWAS.

FIGS. 3A, 3B and 3C show an early embodiment of the invention which utilized an ablative capillary liner.

FIGS. 10A and 10B are plots of simulated droplet velocity versus time for aluminum and steel.

FIGS. 13A, 13B, 13C and 13D are plots of the simulated axial profile of fluid variables at $t=100$ $\mu$s.

FIGS. 14A, 14B, 14C and 14D are plots of the simulated axial profile of fluid variables at $t=140$ $\mu$s.

FIGS. 15A, 15B, 15C and 15D are plots of the simulated axial profile of fluid variables at $t=188$ $\mu$s.

DETAILED DESCRIPTION OF THE PREFERRED EMBODIMENTS

Figure 1A:
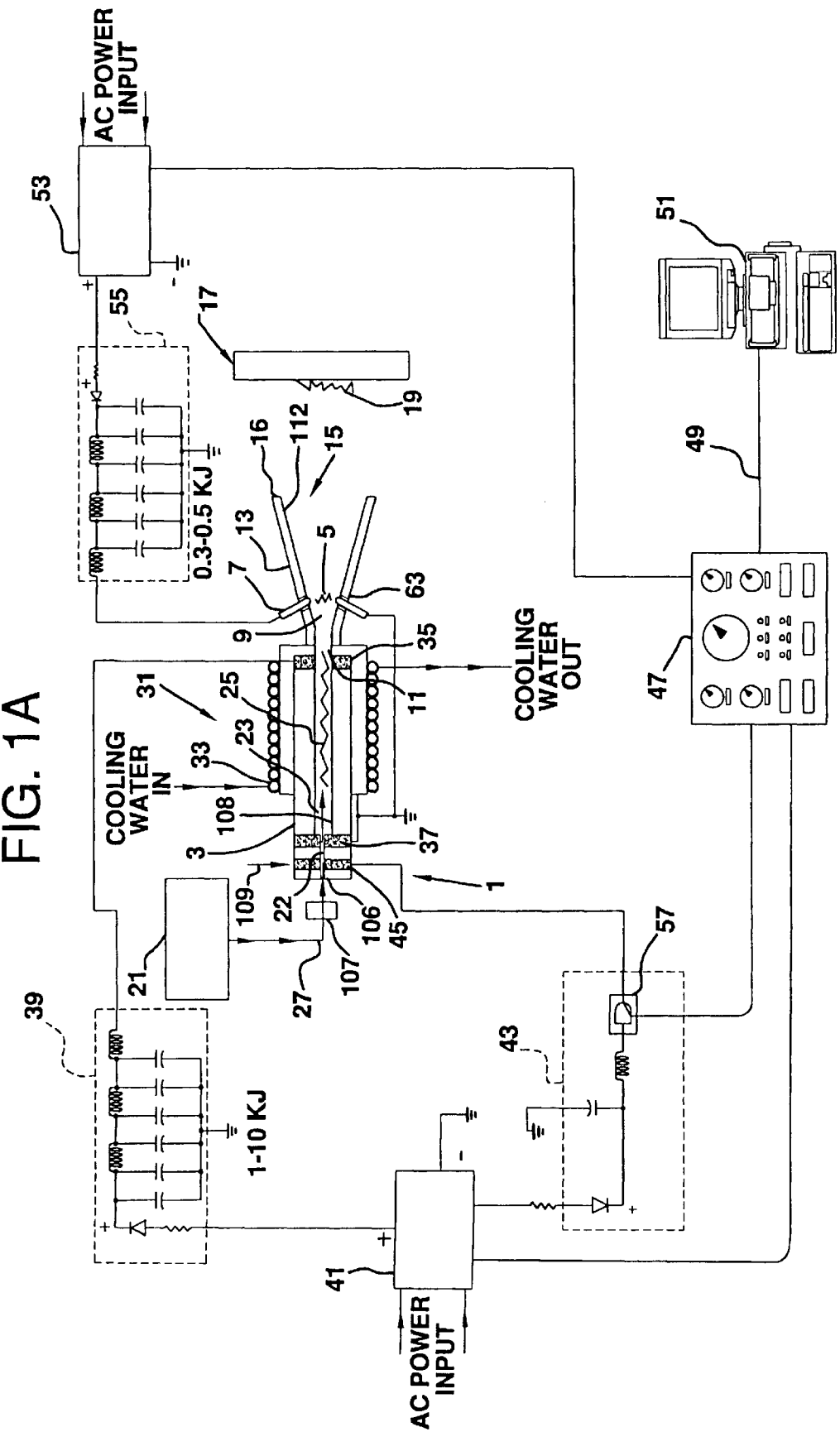
FIG. 1A is a schematic of one embodiment of the PWAS in which a small capillary discharge is used to trigger the main capillary discharge.

Pulsed wire arc spraying uses the technology of pulsed plasma jets to substantially increase the particle velocity of wire-arc spray devices, while maintaining the high deposition rates of conventional wire arc spray. The invention is shown schematically in FIGS. 1A and 1B, with the main difference between the two versions being the method of initiating the main capillary discharge arc. The usual compressed air supply has been replaced with a pulsed plasma jet 1. The capillary 3 is oriented such that the jet aims directly through the arc 5 between the wires 7. The hot, high pressure plasma 9 exits through the open end of the capillary 11. Expansion of the plasma down the barrel/nozzle 13 cools the plasma and accelerates melted droplets stripped from the wires. A rapidly moving transient shock forms in the inert gas 15 which initially fills the barrel/nozzle 13, but quickly travels down the barrel/nozzle and exits as quasi-steady flow is established in the capillary/barrel 13. Flow velocities of >20 km/s are readily obtained in vacuum. The actual velocity is controlled by the specific geometry, the molecular weight and specific heat ratio of the gas, the background gas pressure, and the pulsed energy input. After the pulse, inert gas 15 is once again admitted flushing the system and preventing air from re-entering the barrel/nozzle 13 through the muzzle 16. The cycle then begins again. An inert gas shroud 15 can be incorporated into the muzzle to help protect particles from interacting with air prior to impacting and coating on the substrate 17.

Liquid injection from supply 21 provides a way of introducing the working fluid into the inlet end 23 of the capillary 3 in a form that does not require mechanical confinement and thus is more suitable for repetitive operation at high deposition rates. In one operating mode, a mist of liquid droplets 23 is injected into the capillary 3 immediately before the discharge is initiated. The arc discharge 25 then completely vaporizes the small droplets 23 and provides the same mass of gas in plasma 9 that would be equivalent to tens of atmospheres of confined gas prefill pressure. This method, shown schematically in FIGS. 1A, 1B and 2, easily places the required few hundred mg or so of working fluid mass 23 into the capillary 3. In a different operating mode, the liquid is injected as a stream which is subsequently vaporized by the arc disharge.

Liquid injection has the additional advantage that working fluid mass can be introduced into the capillary quasicontinuously, even during the discharge, as long as the pressure in the feed line 27 is higher than the capillary discharge pressure. This allows for extending of the discharge duration without capillary burnout due to mass starvation. For the present pulsed wire-arc spray device 31, continuous injection is not necessary. Pulsed injection can supply sufficient working fluid to achieve the performance desired.

Cryogenic liquid argon is stored in dewars 21 and is pressure fed into the capillary using compressed helium. Liquid argon is expected to be injected into the capillary through an orifice 106 with either an actively driven fast valve or an automatic pressure driven check valve 107. When pressure in the capillary 3 drops to the pressure in the feed line 27, the valve 107 opens to allow liquid argon to enter the capillary 3. When the discharge fires, the capillary pressure rises and closes the check valve automatically.

The orifice 106 is sized to admit either a thin stream or a spray of liquid droplets into the capillary 3 with the desired mass flow rate for the given pressure differential. It may be desirable to atomize the liquid with the orifice 106 or to simply direct one spray stream along the axis or multiple spray streams directed at the capillary walls 108. Liquid injection in general, and cryogenic feed, in particular, has the attractive feature of providing additional cooling directly inside the capillary 3.

A cooling water system 33 surrounds the capillary for cooling the capillary. The arc 25 is established between electrodes 35 and 37 using a high voltage power supply 39, which is charged by a plasma jet charging power supply 41.

The capacitor bank 39, which provides energy to drive the main capillary discharge arc 25 current of up to a few tens of kiloamps, will operate at voltages no higher than 20 kV, and preferrably no more than 10 kV, in order to reduce cost and increase lifetime of the capacitors. Establishing the main discharge arc 25 cannot be accomplished by such a low voltage for capillary lengths greater than a few centimeters. Therefore, a method must be provided to initiate a sufficiently conducting path in the gas such that the voltage across the electrodes 35 and 37 will cause current to flow. Once conduction begins, the low impedance of the capillary power supply 39 will ensure that a rapidly rising current will ensue, heating and ionizing the gas and turning it into a plasma. The initiation method only needs to provide an extremely short duration "spark" breakdown path in order for the main capillary bank 39 to establish the capillary discharge.

In an embodiment as shown in FIG. 1A, an initial conducting path is provided by the small hot plasma jet emanating from the trigger capillary 109. Trigger capillary 109 is roughly one tenth the volume and length of the main capillary 3, with an energy input only about one tenth that of the main capillary 3. The pressure and temperature reach values comparable to the main discharge. The tiny hot plasma jet proceeds into and through the gas in the main capillary, propagating down the axis and expanding radially until the front reaches near to electrode 35 at which time the voltage impressed between electrodes 35 and 37 by capacitor bank 39 is now sufficient to cause high voltage breakdown and current conduction through the hot conducting path left by the trigger plasma jet. Electrode 37 is shared by both the main capillary and the small trigger capillary.

A trigger power supply 43 connected to the charging power supply 41 supplies power to a trigger electrode 45. A control system 47 connected by a fiber optic link 49 to a computer 51 controls the wire arc charging power supply 53 which charges the wire arc power supply 55. The control 47 also controls the plasma jet charging power supply 41. The power supply 39 is operated without a switch, since the gas in the capillary 3 acts as a virtual switch, which is "closed" by the small plasma trigger jet.

A trigger switch 57 shown in power supply 43 is controlled by the control system 47. Preferably power supply 43 is triggered, and control system 47 controls similar trigger switches in power supply 55 to supply voltage and current to the wire arc 5 substantially concurrently. In order to optimize performance, in practice it will be preferrable to provide for an adjustable time delay of up to a few microseconds between the firing of the capillary discharge and the firing of the wire arc.

Figure 1B:
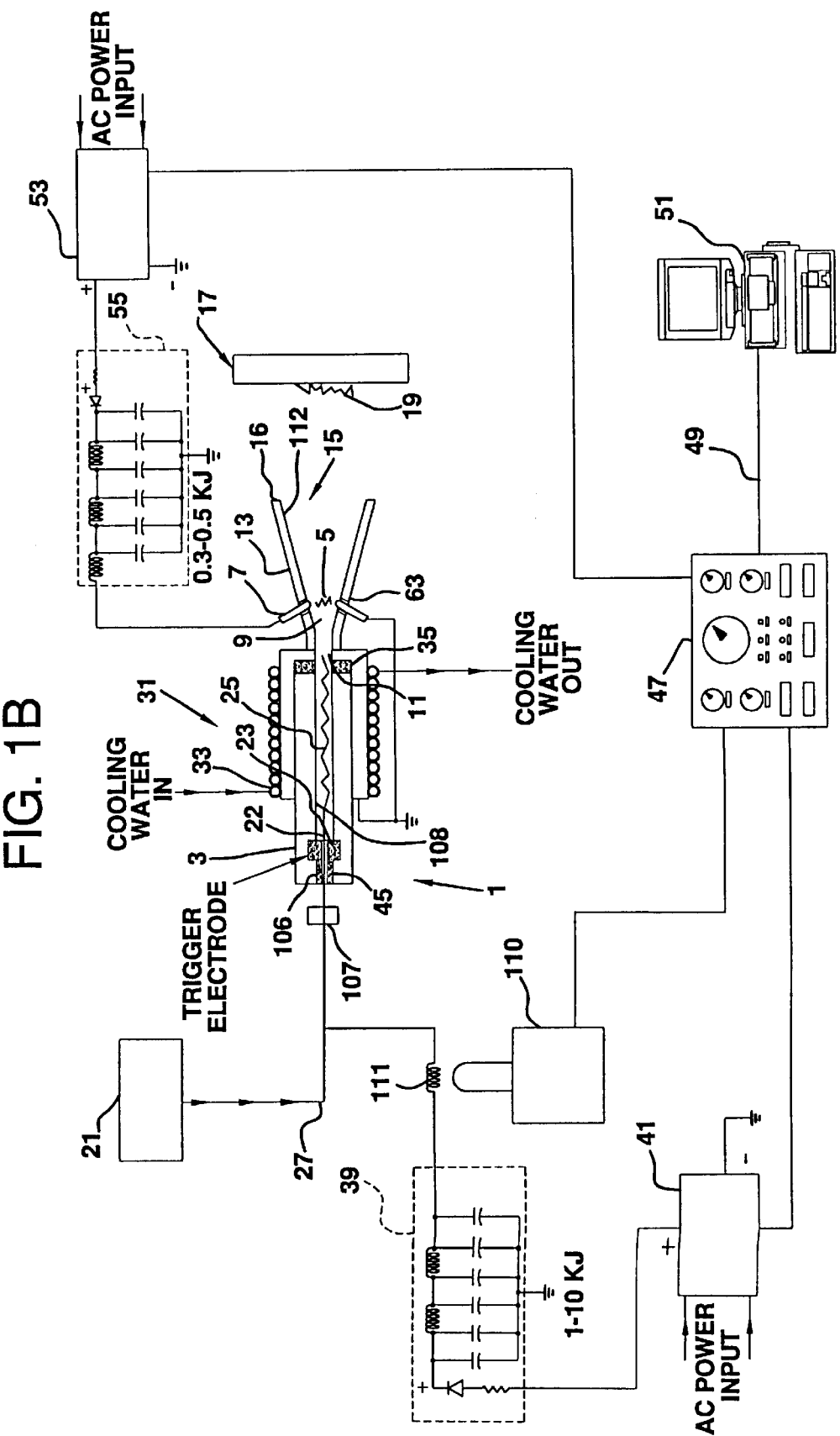
FIG. 1B is a schematic of a preferred embodiment of the PWAS in which an externally impressed high voltage corona-like discharge provides a breakdown mechanism for initiating the main capillary discharge.

In a preferred embodiment shown in FIG. 1B, the small trigger plasma jet is replaced by an inductively coupled, high voltage spike produced in a high voltage pulse generator 110. Trigger pulse generator 110 produces a high voltage spike between electrodes 45 and 35 by inductive coupling through inductor 111. This voltage spike can be many tens of kV but which lasts for only nanoseconds. It produces a corona-like discharge along the inner wall of capillary 3 between electrodes 45 and 35. This annular conducting region provides a convenient breakdown path for the main capacitor bank 39 to establish the arc discharge 25. This method of arc initiation is preferred over the small triggering plasma jet since it reduces system complexity signficantly and provides a more desirable initial conductivity profile.

Figure 2:
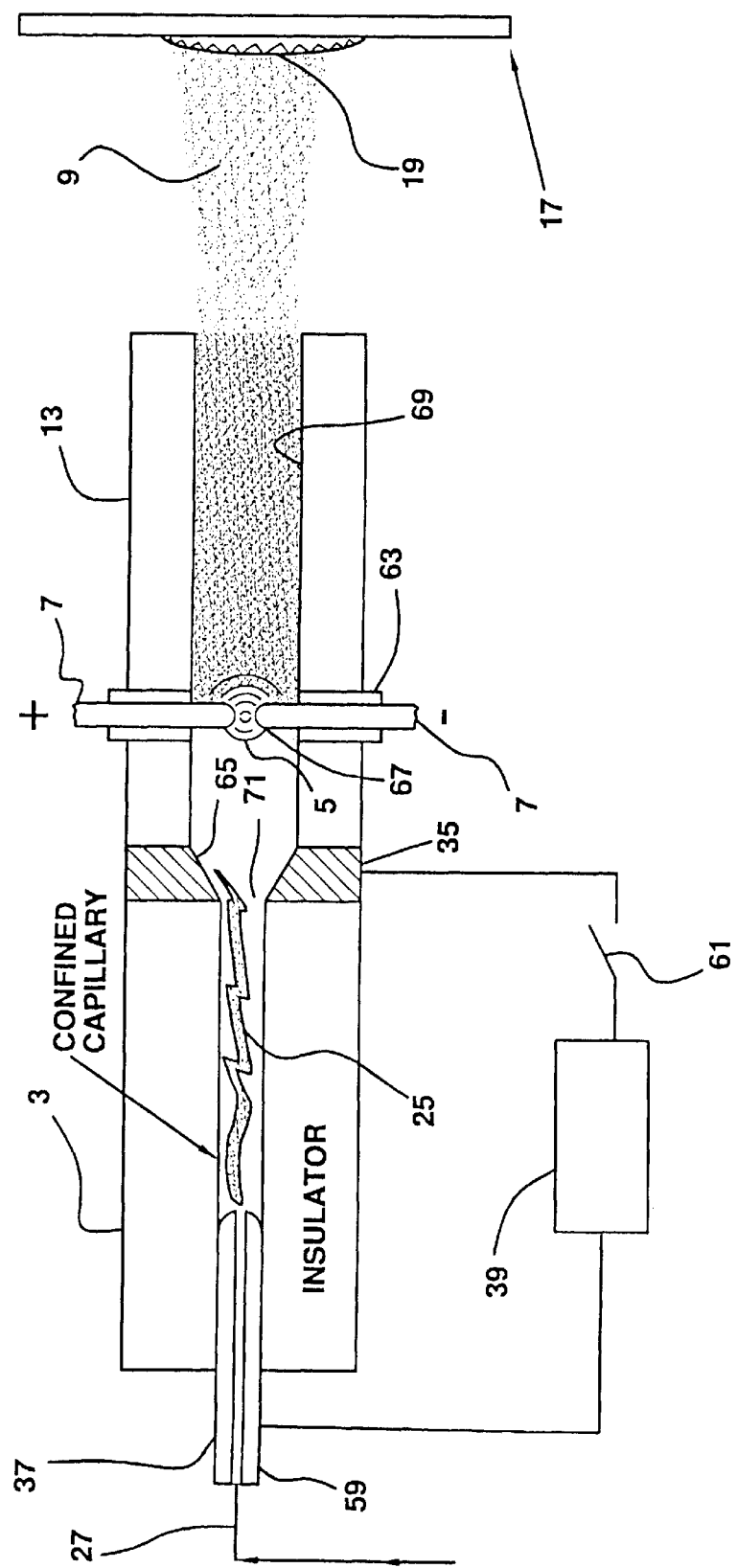
FIG. 2 is a schematic representation of a simplified embodiment of the PWAS.

In one embodiment schematically shown in FIG. 2, the inert gas or liquid supply 27 provides fluid to an elongated inlet tube 59, which also serves as the inlet anode 37. The capillary arc power supply 39 is controlled by a switch 61 connected to the controller 47 shown in FIG. 1 to ignite the arc 25 in the capillary 3. A similar switch supplies power to the wires 7, igniting the wire arc 5. The wires are fed through insulating bushings 63 in the nozzle 13. The capillary electrode 35 is shown with a divergent opening 65, which feeds to the barrel 13. The tips 67 of the wire 7 are preferably almost flush with the inner surface 69 of the barrel, and are positioned close to the capillary exit 71. Preferably the nozzle 13 is diverging.

FIGS. 3A–3C show an early embodiment 71 of the invention. The substrate 17 is mounted on a substrate holder 73 within a chamber 75 closed at both ends 77 and 79. Capillary tube 3 with a liner 81 extends into end 79 of the chamber 75, and a barrel 13 extends outward from the capillary tube and directs the plasma 9 to gap 5 between the wires 7.

Figure 4A:
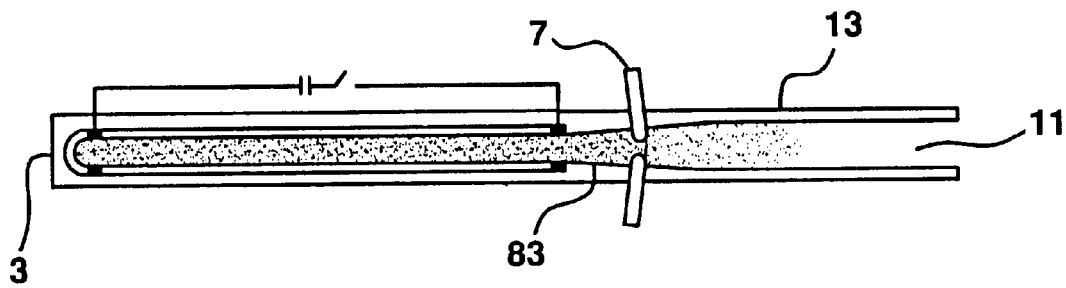
FIGS. 4A, 4B, 4C and 4D are details of four nozzle designs for the capillary.
Figure 4B:
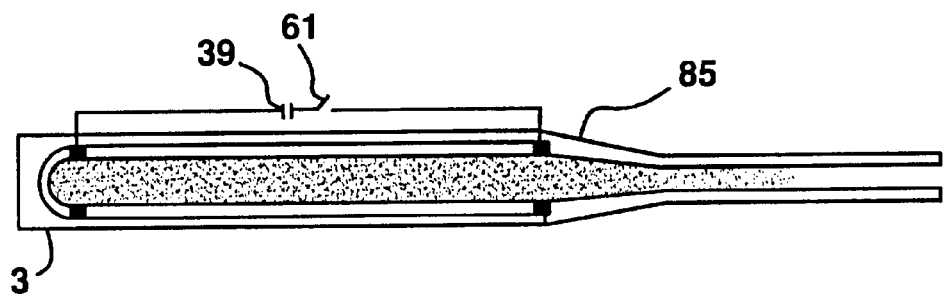
Figure 4C:
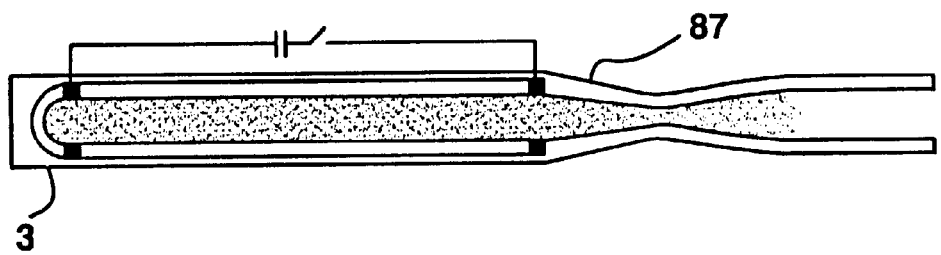

FIGS. 4A–4D show four nozzle choices for the capillary. FIG. 4A shows an expansion nozzle 83. FIG. 4B shows a converging nozzle 85 connected to the capillary 3. FIG. 4C show a converging/diverging nozzle 87 connected to the capillary 3.

Figure 4D:
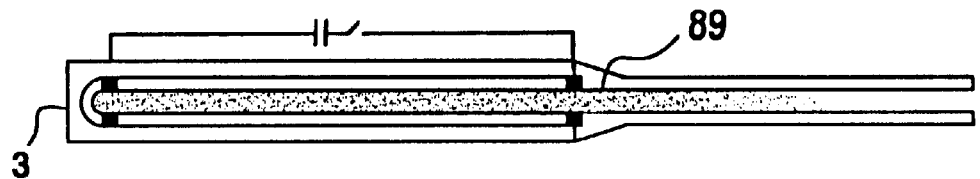

FIG. 4D shows a constant diameter nozzle 89 connected to the capillary.

Figure 5A:
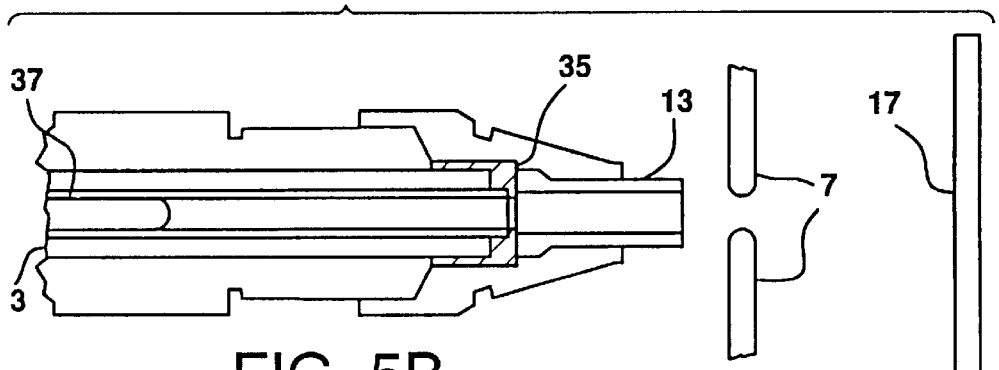
FIGS. 5A, 5B, 5C and 5D are cross-sections of the four-step process of the PWAS system.
Figure 5B:
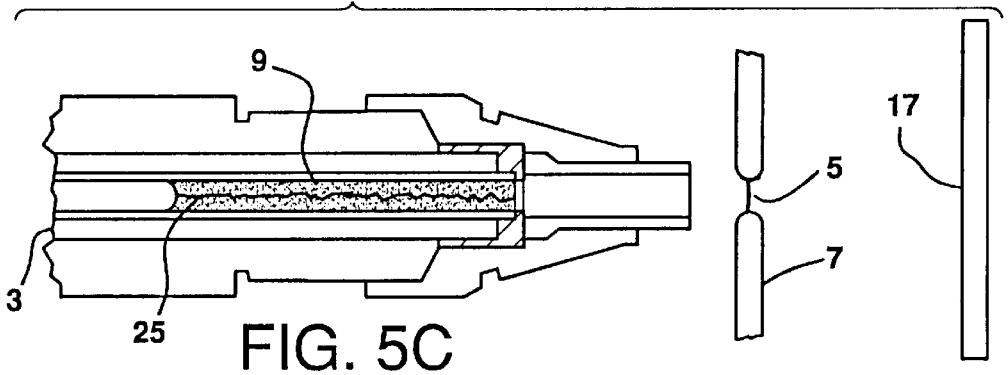

FIGS. 5A–5D show the four-step process in an early embodiment of the invention. The capillary 3 has the cathode 37 and the anode 35, and is connected to a barrel 13. Wires 7 provide a cathode and an anode opposite the substrate 17. FIG. 5A shows the initial state with both systems at rest, prior to firing. Each electrode pair is separately coupled electrically to a separate capacitor bank, (not shown here), to provide the pulsed energy source. Arcs 25 and 5 are ignited. Arc 5 melts the surface of the wires 7 at the arc, and arc 25 creates the plasma 9 within the capillary 3.

Figure 5C:
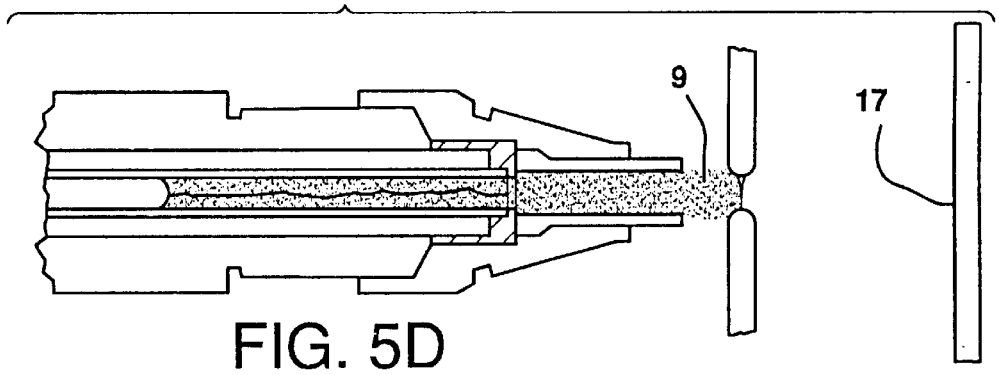

As shown in FIG. 5C, the high speed, high temperature plasma 9 exits the capillary.

Figure 5D:
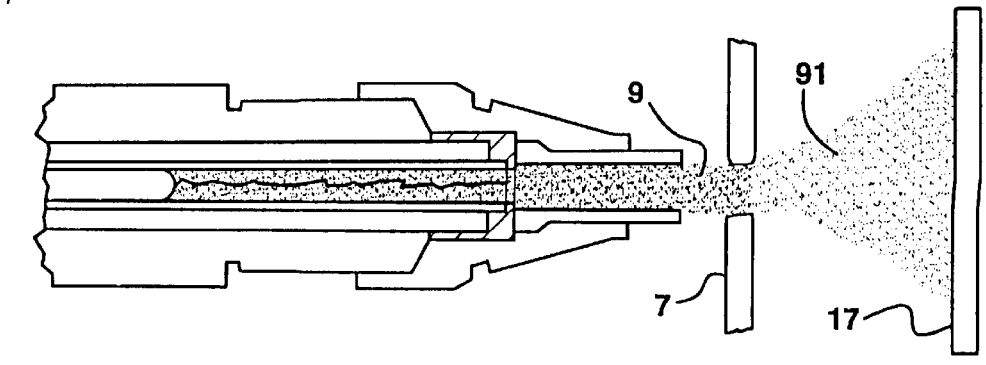

In FIG. 5D, the plasma 9 is shown stripping the melted particles from the wires 7 for atomizing and accelerating the particles 91 toward the substrate 17 to form a dense coating on the substrate.

Figure 6:
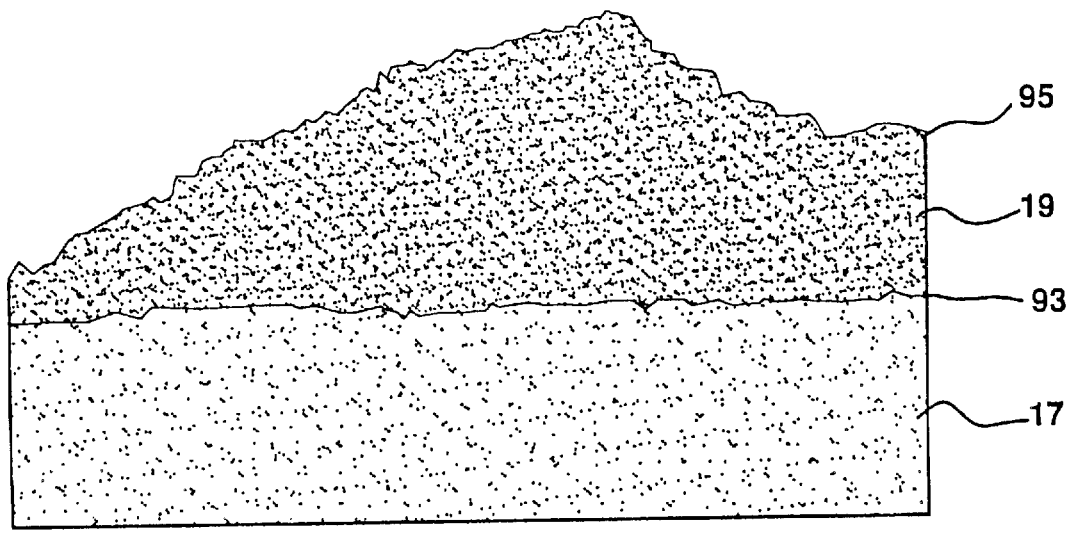
FIG. 6 is a photomicrograph showing the bonding interface between the substrate and a single PWAS splat.

FIG. 6 shows a photomicrograph of the bonding interface 93 between the substrate 17 and a single splat 95 of the coating 19.

Figure 7:
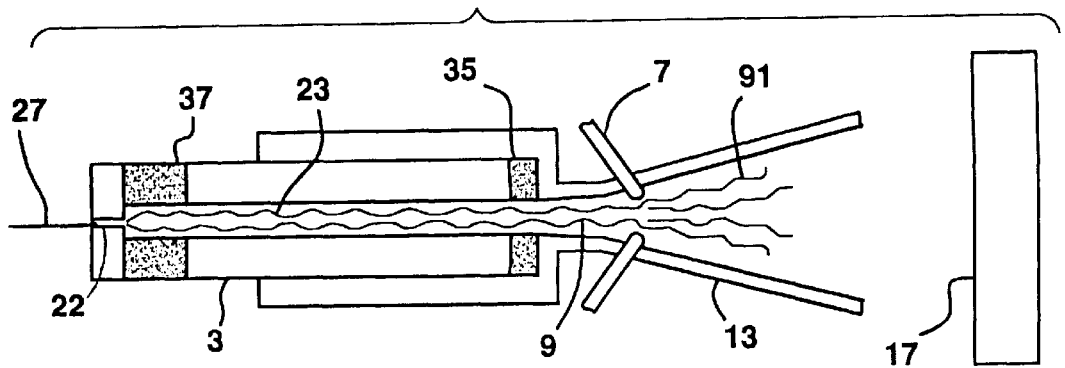
FIG. 7 shows a baseline coaxial pulsed wire arc configuration.

FIG. 7 is a schematic representation of the base line coaxial pulsed wire arc spray configuration, with the nozzle 13 diverging at about 5°–30° and the wires 7 extending into the nozzle near the exit of the capillary tube. This is expected to be the most versatile configuration for general spraying applications. The ceramic capillary structure 3 is fabricated of BN, $Si_3N_4$, SiC, or other advanced ceramic to allow non-ablative operation. The working fluid is supplied through line 27 to the inlet 22, and an arc is ignited between the electrodes 35 and 37 to create the high speed, high temperature plasma 9, which strips melted particles from the surfaces of the wires 7 which are heated by an arc between ends of the wires. The melted particles 91 are accelerated toward the substrate 17.

The working fluid is provided by injection of liquid argon, which provides the mass required to fill the capillary chamber 3 with a gas equivalent of 30 atmospheres, but without the need of mechanical confinement. Argon is currently supplied to many spray facilities in liquid form, since it is actually cheaper in bulk than the equivalent quantity of gas, and is easier to deal with. Use of atmospheric pressure gases for the working fluid appears to be useful only for very low spray rates, perhaps for fine detail work.

The liquid argon is admitted through a triggered fast acting valve or an automatic check valve 107. The liquid enters through a small orifice at inlet 22, is partially vaporized on contact with the walls, and quickly fills the capillary 3 with gas 23 and a mist of liquid droplets. Before the gas 23 has sufficient time to flow out the nozzle 13, which occurs on a time scale of a few msec, the electrodes 35 and 45 generate a spark which induces breakdown through the gas 29 of the entire capillary channel. The discharge quickly raises the capillary pressure to about 1 kbar (~15,000 psi) and to a temperature of roughly 1 eV (11,600 K).

The wire arc electrodes 7 penetrate through the barrel/nozzle assembly 13 through insulating bushings 63 and are roughly flush with the inner wall 112 which is preferrably a refractory metal or ceramic liner. The location of the electrodes is close to the capillary anode 35. The nozzle 13 has a slight taper of about 5–10 degrees. Bushings 63 also provide pressure sealing around the wires.

The wire arc discharge occurs simultaneously or a few microseconds after the plasma jet is initiated to provide sufficient time for conductive plasma to exit the capillary and provide an easy breakdown path for the wire discharge. The discharge pulse lasts about 100 $\mu$s for both capillary discharge and wire arc discharge.

Table 7 summarizes approximate operating parameters of the Pulsed Wire Arc Spray device for the capillary size listed.

Figure 8:
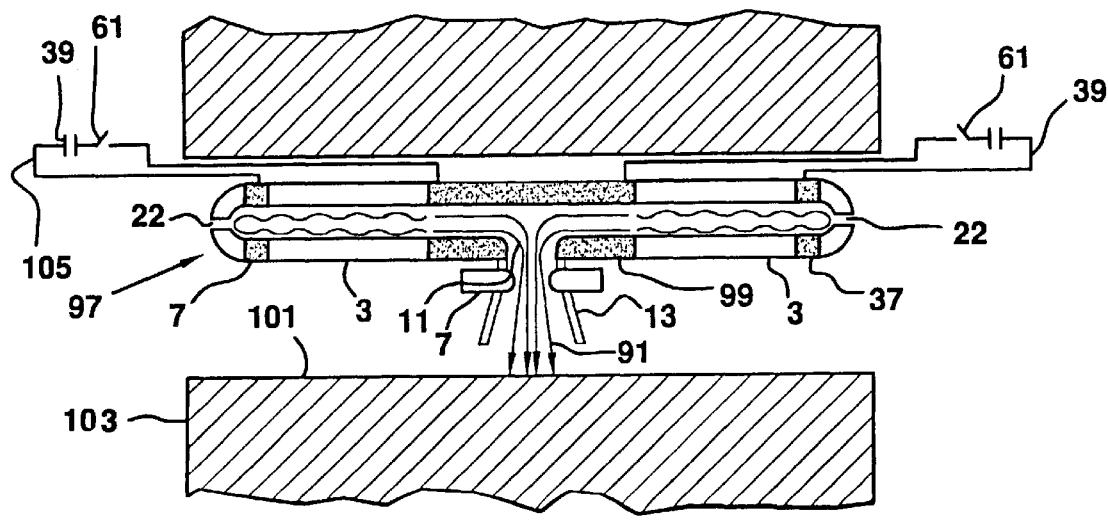
FIG. 8 shows a dual-jet pulsed wire arc configuration.

FIG. 8 shows one embodiment of a dual jet configuration for spraying small inner bores such as pipes and tubes, one of the more difficult tasks for thermal spray devices of any kind. An interesting application is spraying iron on the inner surface of next generation aluminum engine block cylinders 101. Space is constrained. Existing spray devices have to spray at an angle or use performance-robbing right angle diverting attachments. The Pulsed Wire Arc Spray device is ideally suited for this application by using the conceptual configuration shown in FIG. 8.

Working fluid for this application does not need to be liquid argon. It can be room temperature liquid hydrocarbons, which in this case are considerably more convenient and cost effective, since the presence of the carbon is not necessarily a negative feature.

The device 97 operates in the same general manner as the previously described baseline configuration, but is more compact and designed to move through a tubular enclosure. The power supplies 39 are located externally with coaxial cables 105 delivering the pulsed power to the capillaries 3. The two jets 35 are connected in series and fire simultaneously towards each other, causing the jets to stagnate at the center and redirect the high pressure, high velocity flow out through the side port with a small nozzle 13. The jets can be powered by separate capacitor banks or arranged. The wire-arc electrodes 7 are continuously fed toward each other in this side port.

A specific advantage of PWAS is that it can accelerate iron droplets to as high as 800–1000 m/s in only 1–2 cm distance, so the entire assembly fits within a 3" diameter cylinder, or smaller. This system should be able to provide the desired 10 kg/hr spray rate required by the engine manufacturers. The entire assembly is mounted on a stalk which reciprocates and rotates in a manner to provide complete coverage of the inner surface of the cylinder. This eliminates the need for moving the sprayed part. Technical advantages and drawbacks of PWAS are shown in Table 8.

The dual jet configuration is generally indicated by the numeral 97. Parts of the dual jet which are similar to the single jet are numbered with the same numbers as the single jet. The central monoblock ring 99 acts as the electrode 35 for both capillary discharges. Two separate electrodes could also serve this function, but increases complexity and part count and is less attractive. The electrodes 37 are provided at the inlet ends 22 of the capillary tubes 3. Separate capillary power supplies 39 controlled by separate switches 61 may be employed. Another embodiment would use a single capillary power supply and operate the two jets electrically in series.

The consumable wire arc electrodes 7 are fed into the short divergent nozzle 13 at the exit 11. In another embodiment, only a single wire electrode is used in conjunction with a non-consumable electrode, for which the central monobloc 99 is the preferred choice.

The jet gases propel the melted droplets 91 onto the inner cylinder surfaces 101 of the engine block 103 at high speed. As in the other coating systems, such as 31, a mechanical means is used to move the plasma jet apparatus 97 with respect to the engine block 103, or to move the engine block 103 with respect to the plasma jet 97, to provide a uniform coating. It is preferred that all attachments to the sprayer unit enter the tubular enclosure to be sprayed from one side only so that dis-connections and re-connections of cables, leads, and feed lines do not have to be made prior to repositioning for spraying another tubular enclosure.

Heating of a liquid spray by an electrical discharge is governed by heat transport to the droplet phase. Once evaporated, the vapor is heated by the discharge plasma to a temperature and pressure determined by the discharge power, chamber geometry, and mass flow rate. Proper distribution of the spray in the chamber is important to prevent local burnout.

The main possibilities involve spraying water, liquid hydrocarbons, liquid argon and liquid nitrogen. Water injection is attractive for spraying materials such as oxides where surface interaction with oxygen is less of a concern. Although injection of fluid as a stream is acceptable, it is preferable to inject fluid as a mist. Liquid can also be directed onto the surface of the capillary liner. Absorption of vaporization energy helps cool down the walls. Liquid hydrocarbons are useful for spraying some materials such as iron or steel, but introduces safety issues associated with combustible fuel. Injection is similar to fuel injection in a car engine.

The most generally useful overall approach is to inject an inert gas such as liquid argon. Liquid nitrogen can also be considered inert in some applications. Liquid argon is readily available in many thermal spray shops, since it is often supplied in liquid form to provide the gas used in plasma sprayers. Argon is actually cheaper supplied in bulk liquid form than in gaseous form, which provides a cost advantage.

The basic principle of gas atomization is straightforward, however, the details are complicated. Breakup is a result of more than one mechanism, but in general it is a process in which the stabilizing influence of surface tension is disrupted by an external force, namely high velocity gas flow. Breakup is caused primarily by instabilities caused by a light fluid pushing against a heavier fluid, and partly by viscous forces which tend to distort the outer periphery of the molten droplet.

The kinetics of all atomization processes typically involve one or more of the following five steps:

The extension of the bulk liquid (e.g. molten metal) into sheets, jets, films, or streams is caused by accelerating the liquid in some prescribed manner.

Initiation of small disturbances at the liquid surface forms localized ripples, protuberances, or waves.

Formation of short ligaments on the liquid surface results from fluid pressure or shear forces.

Collapse of the ligaments into drops results from surface tension in the liquid.

Further breakup of the liquid drops as they move through the ambient gaseous medium is by the action of fluid pressure or shear forces.

Droplet breakup and atomization is essentially a competition between external dynamic pressure and viscous shear forces which tend to tear the drop apart, and the surface tension and internal viscous forces which tend to resist deformation and breakup. The total amount of energy required increases rapidly as the mean particle size decreases (i.e. as the total surface area increases). Breakup and atomization of liquid droplets is ultimately governed by how efficiently energy from the atomizing fluid can be coupled into the molten metal generating fine isolated particles.

A drop of liquid moving in a gaseous medium experiences secondary disintegration when the dynamic pressure due to gas stream velocity exceeds the restoring force due to surface tension. This occurs if the Weber number, defined as $$N_{Weg} = \rho_g u_r^2 D_p / \sigma_p,$$

exceeds a critical value. Here $\rho_g$, is the gas density, $u_r$, is the relative velocity between gas and drop, $D_p$ is the drop diameter, and $\sigma_p$ is the surface tension of the liquid drop. The critical value is about 13 for liquids of low viscosity when the relative velocity is applied very suddenly, as would be the case for an impinging shock front. This is termed stripping breakup. If the relative velocity is applied slowly, then the value is about 22. This would be the case, for instance, for a drop accelerating under gravity. Intuitively, one would expect the critical value to increase with the viscosity of the liquid, and this is indeed the case. The critical value will increase by the factor $k_{\mu p}$ defined by $$k_{\mu p} = 1 + [\mu_p / (D_p \rho_p \sigma_p)^{1/2}],$$

where $\mu_p$, is the liquid viscosity. This makes sense physically, since a higher liquid viscosity tends to make droplet breakup more difficult.

As a given droplet breaks up into ever smaller droplets, eventually a point will be reached where the Weber number is no longer greater than the critical value, and further breakup is not possible. According to this model, particle size depends primarily on gas density $\rho$, the relative velocity $u_r$, and the surface tension $\sigma_m$. For a given pure liquid, the only way to produce finer particles is to increase $\rho$ and $u_r$. Since it is difficult to increase $\rho$ significantly, the best approach for refining particle size is to increase the relative velocity $u_r$.

Atomization of the molten wire material by the plasma jet has the distinct advantage of operating at higher gas density and gas flow velocity than conventional wire arc spray, the two most important controllable factors in how small a droplet forms. Flow velocities can be increased by at least an order of magnitude relative to conventional wire arc spray techniques while simultaneously increasing gas densities an order of magnitude. Pulsed plasma jet technology therefore provides an innovative solution to increasing both gas density and velocity, leading to finer spray atomization and consequently higher velocity droplets.

Conceptual development is driven by several factors, the melting and stripping of the droplets, the acceleration mechanism of the droplets, the chemical and thermal environment of the droplets, the requirement of repetitive operation, component survivability for commercially useful times, and operating costs.

Acceleration of a single coating droplet is determined by solving the drag equation $$\frac{du_p}{dt} = \frac{3}{4}\frac{c_d}{d}\left(\frac{\rho_g}{\rho_p}\right)(u_g - u_p)^2,$$

where $u_p$, $\rho_p$, and d are the particle velocity, density and diameter respectively, $\rho_g$ and $u_g$ are the gas density and velocity as determined by the fluid equations, and $C_d$ is the drag coefficient, which is approximately 0.44 for most cases of interest here. This equation tells us that for a given particle size and density, the determining factors are the velocity of the gas relative to the particle and the density of that gas. The higher the gas density and the higher the relative velocity, the stronger is the accelerating force on the particle. In essence, one of the goals of all thermal spray devices is to maximize this quantity.

A good coating also requires the proper thermal and chemical state of the droplet, typically either molten or in a plastic state just below the melting point (at least for powders). One problem with conventional wire-arc spray is the use of cold gas to accelerate the droplets resulting in in-flight freezing of many droplets prior to impact on the target substrate. Using a pulsed plasma jet eliminates this problem.

Repetitively operating hardware attempts to maximize the quantity $\rho_g(v_g - v_p)^2$. A working fluid introduced into the capillary region in a repetitive manner allows a ceramic capillary liner to survive essentially indefinitely, and yet still provides sufficient mass to accelerate the particles without exceeding chamber and barrel temperature limits. It is desirable to operate the capillary discharge at roughly 1 kbar and 1 eV to achieve the desired performance, where 1 eV is defined as 11,600 K.

The pulsed process has several specific advantages over conventional wire arc spray atomization which makes it very attractive from a commercial point of view. The first of these is that the pulsed plasma jet provides an initial strong shock which induces primary disintegration of the droplets in a manner which is potentially more efficient than allowed by continuous flow techniques. This is partly a result of the fast, high pressure shock front (~1 kbar) which impacts the droplets and partly due to the fact that the melt can be arranged so that it and the plasma jet have comparable cross-sectional dimensions in the atomization interaction zone. These small droplets form in just a few mm. These plasma jets are efficient atomizers.

Another advantage is that after the initial breakup of the melt, further secondary disintegration is induced by the high speed gas flow behind the shock. Although gas flow velocities as high as 20–30 km/s are readily attained in vacuum, the process operates with gas velocities in the 3–5 km/s range. Conventional wire arc spray is limited to a few hundred meters per second due to the use of cold air. The plasma jets high velocity can be obtained without a corresponding decrease in gas density (relative to cold air flow) and thus can provide a momentum flux two orders of magnitude higher than is possible with cold gases.

The high temperature of the gas (which can be greater than the melt temperature) prevents premature solidification of the droplets prior to complete disintegration. This feature, along with the higher gas flow velocity, prevents the formation of solid inclusions in the coating.

The performance capabilities of a pulsed ET sprayer with liquid argon injection were studied as a function of various parameters, including droplet size, prefill pressure, energy input, energy input rate (i.e. discharge duration), barrel length, and droplet start location.

Four geometrical cases are shown in FIGS. 4A, 4B, 4C and 4D. For the Pulsed Wire Arc Sprayer, Case A, the expansion nozzle case, seems to be the best overall configuration, with a shallow divergence angle, and no straight barrel section, or at least very short. Case D gives better performance, since the density of gas is used most effectively. A concern is that a non-diverging barrel/nozzle would lead to droplets sticking to the wall, and degrade performance.

Since a ceramic insulator is preferred to be used for the capillary liner, the thermal loads to the wall are considered to determine at what temperatures the capillary discharge can operate and for how long. The temperature rise of a surface subjected to a sudden heat flux q is given by $\Delta T = \alpha q t^{1/2}$, where $\alpha = 2/(\pi \rho c k)^{1/2}$ and $\rho$ is density, c is specific heat and k is thermal conductivity. This equation indicates that ablation can be avoided, for a given heat flux q, by keeping the pulse time sufficiently short. The so-called "grace period" is the time a surface can be exposed to a given thermal flux before ablation begins, and is different for each material as determined by its a and vaporization temperature.

Figure 9:
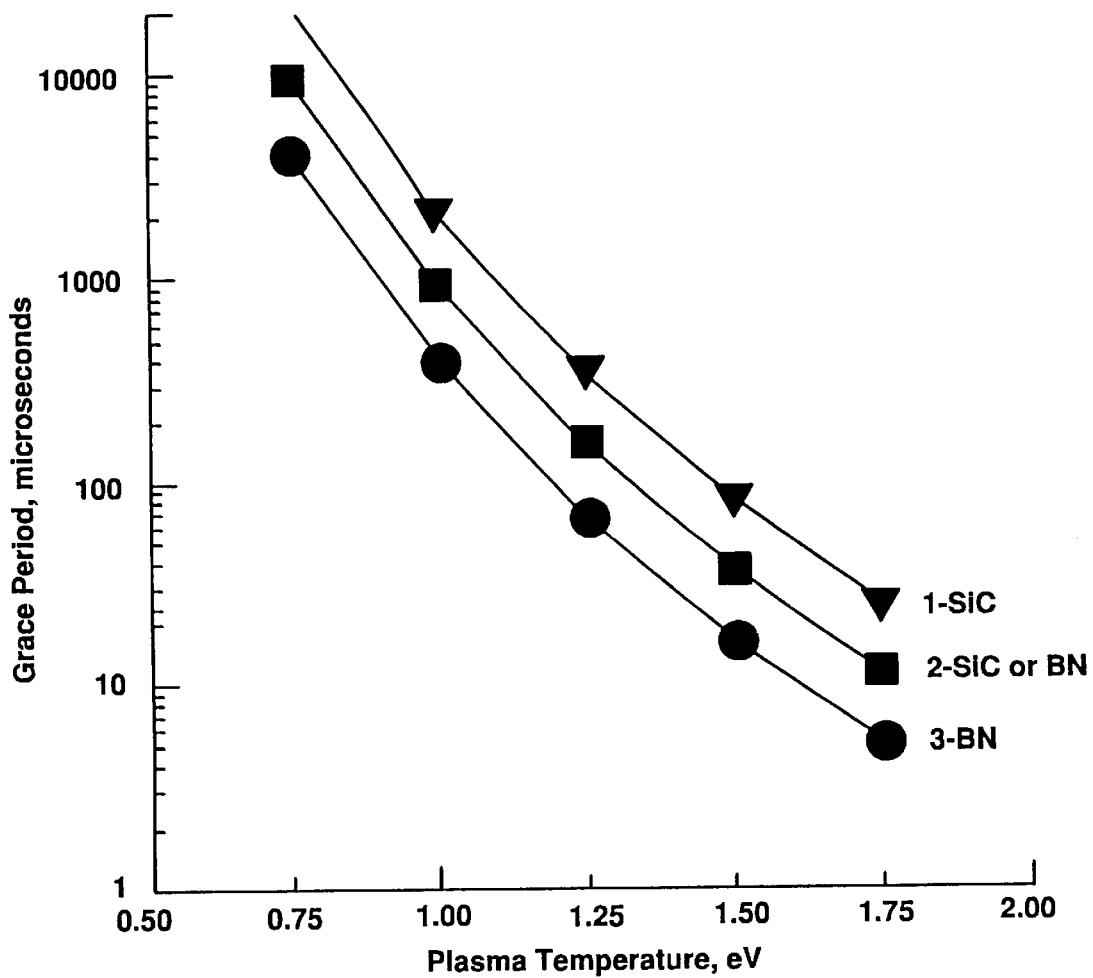
FIG. 9 illustrates the time scales for representative heat flux parameters for BN and SiC insulators.

FIG. 9 illustrates the time scales for representative heat flux parameters for a BN insulator. The curve labeled 3-BN represents the case for a flat radial temperature profile in the capillary. Curve 2, SiC or BN, represents the more realistic case in which a lower temperature boundary layer forms at the wall which can reduce the heat flux q to the wall by as much as a factor of two over the heat flux calculated from the core plasma temperature on axis. Curve 1, SiC, is for SiC with a reduced wall flux.

The capillary discharge operates at temperatures in the 1.0 to 1.5 eV range for 100–1000 microseconds without damage to the ceramic insulator. The peak temperature should be limited to about 1.0 eV. The capillary should not be exposed to this temperature for more than 200–300 $\mu$s. Operating at a relatively high temperature maximizes the sound speed which ultimately determines the droplet speed.

Knowing the temperature limit range allows operating in the 1 kbar range. Working backwards yields the density required to obtain 1 kbar pressures at 1 eV. For the Ar mix this turns out to correspond to a prefill pressure of 30 atm. A prefill of 10 atm allows peak pressures of about 0.33 kbar, which is still substantially above existing thermal spray devices.

The case of a capillary 1 cm in diameter and 10 cm long, with a nozzle expanding out to 2 cm diameter over a distance of 20 cm corresponds to case A in FIG. 4A with a straight barrel section of zero length. The capillary is pre-filled to 30 atm with Argon gas, and the capillary discharge is simulated by uniformly depositing a total of 1 kJ of energy into the capillary volume over a time of 100 $\mu$s. The capillary contains a total of 308 mg of Argon, allowing an efficient acceleration of 30–60 mg of molten droplets per pulse. The wire arc electrodes are located at 12 cm. The total gas flow rate for these conditions at 10 Hz firing rate is about 300 SCFH, yielding a spray rate of about 1 kg/hr. At 100 Hz, the spray rate goes up to about 10 kg/hr, and the gas flow rate is about 3000 SCFH, comparable to wire arc spray numbers, but at much higher impact velocities.

Figure 11A:
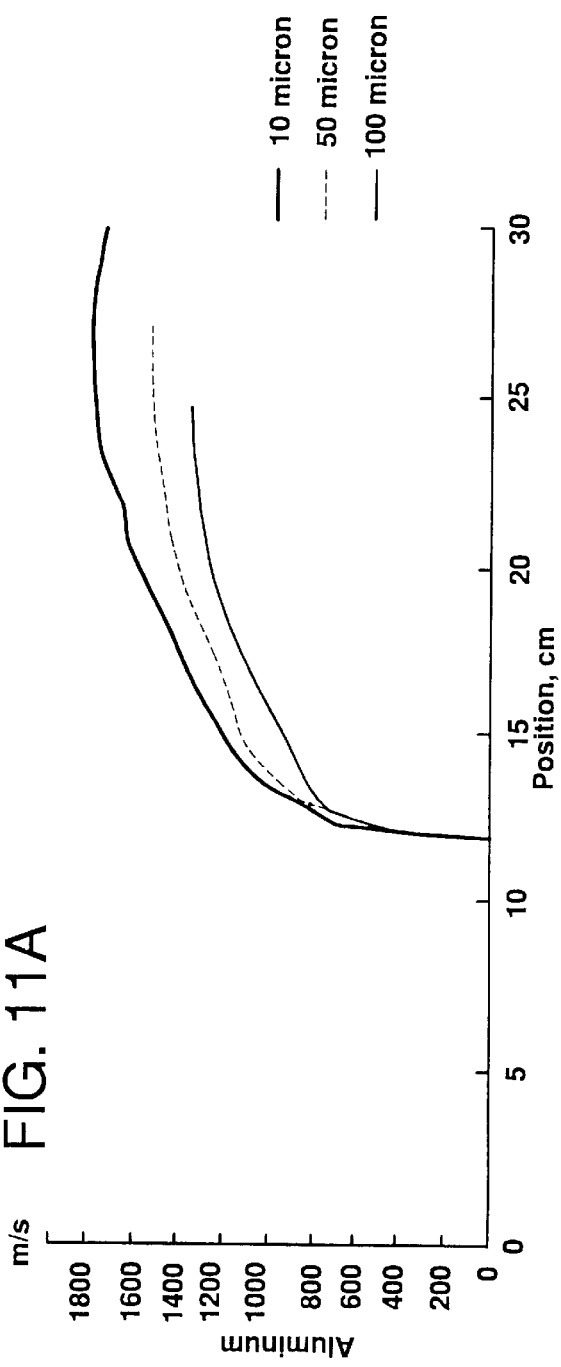
FIGS. 11A and 11B are plots of simulated droplet velocity versus position for aluminum and steel.
Figure 11B:
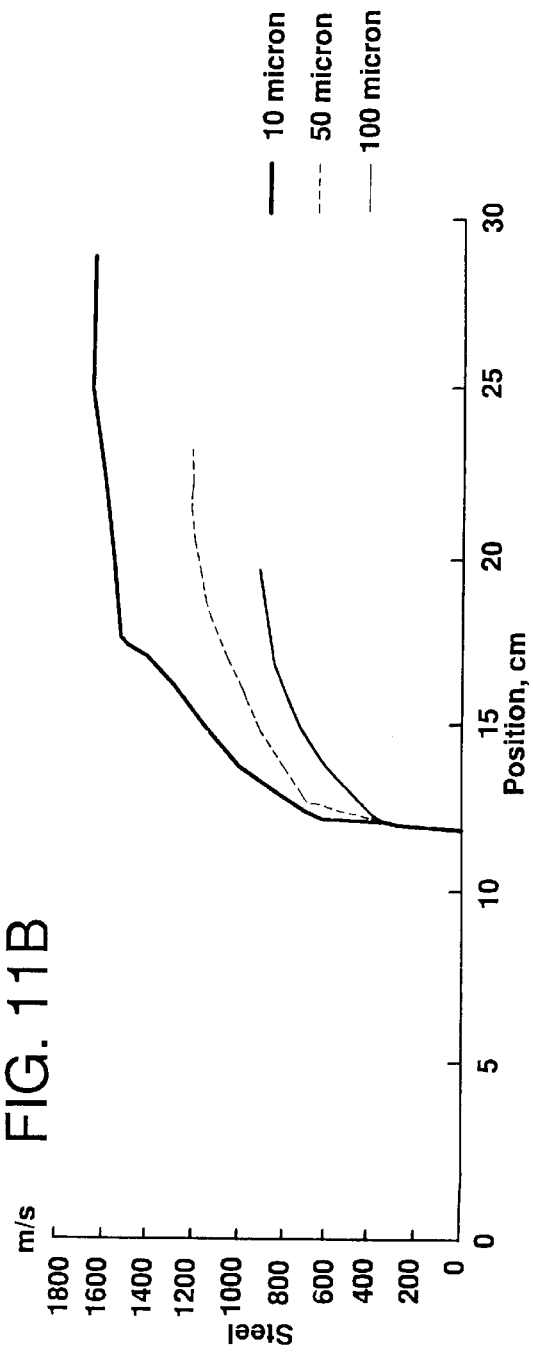
Figure 12A:
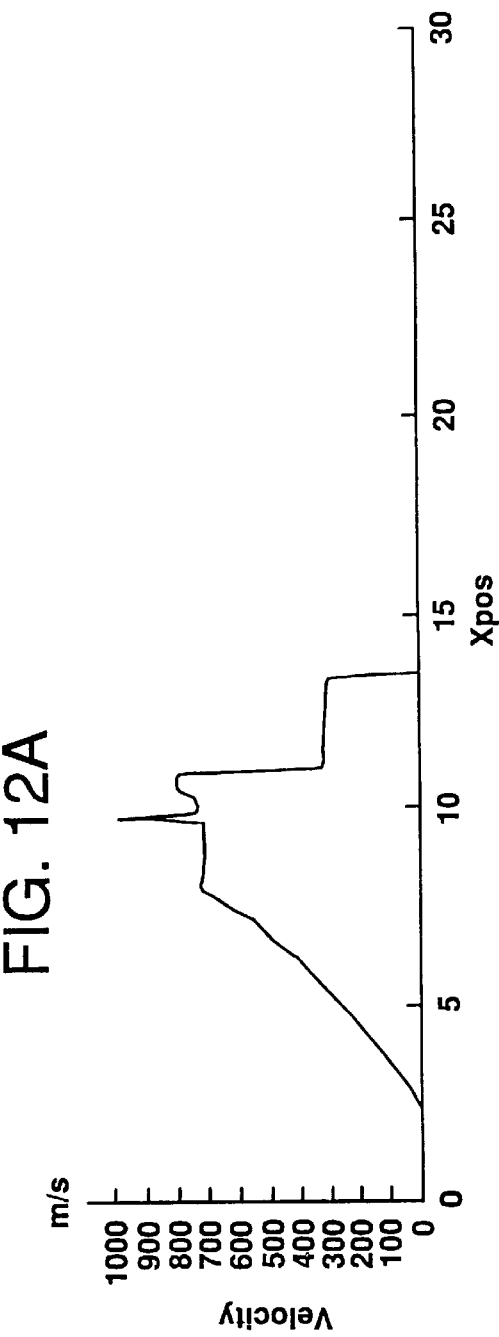
FIGS. 12A, 12B, 12C and 12D are plots of the simulated axial profile of fluid variables at $t=58$ $\mu$s.
Figure 12B:
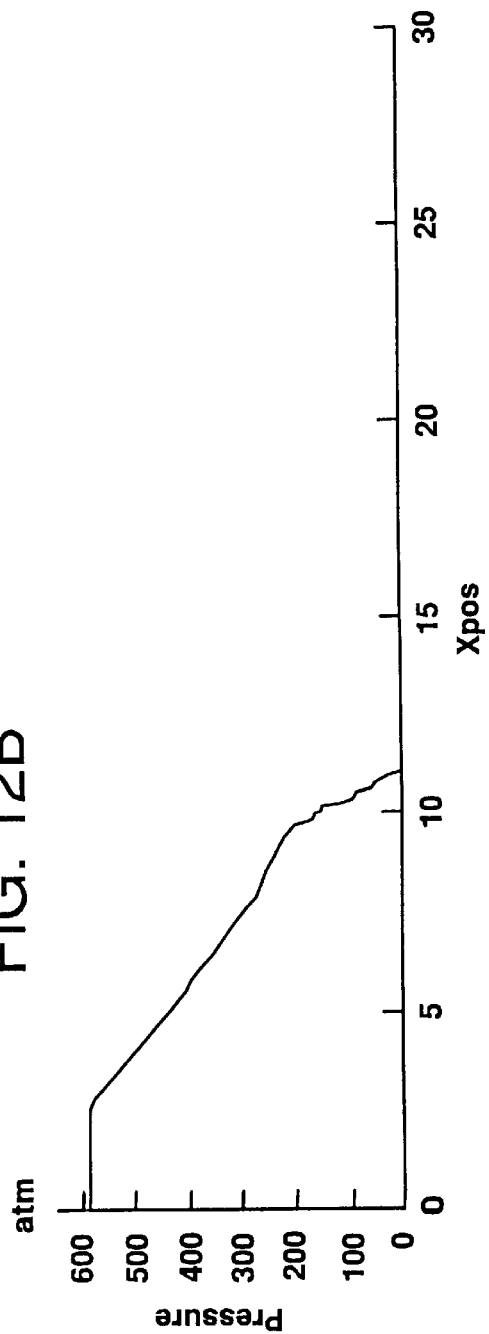
Figure 12C:
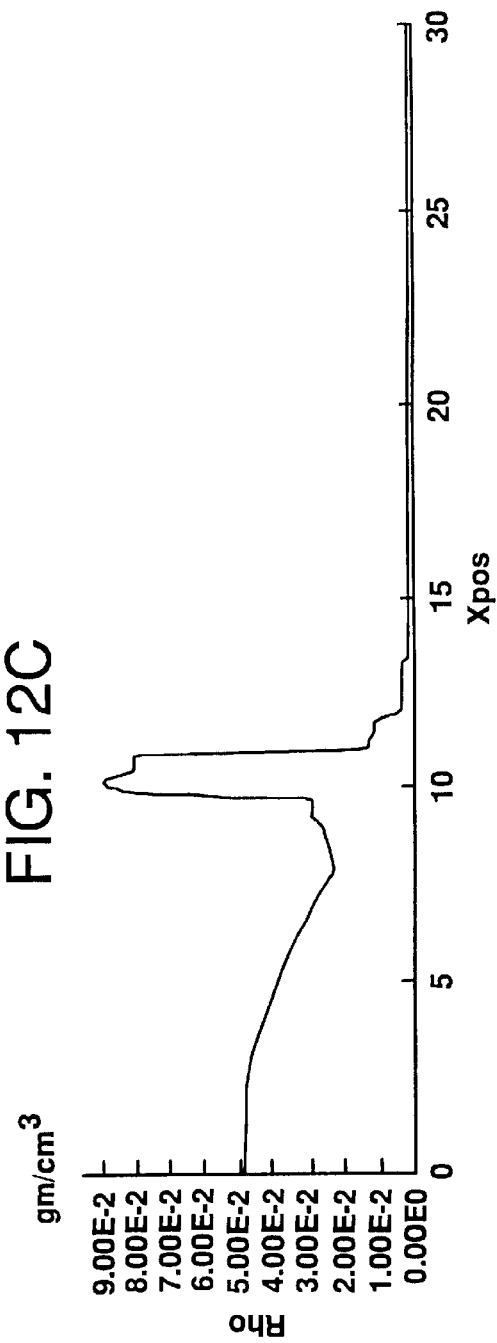
Figure 12D:
Figure 13A:
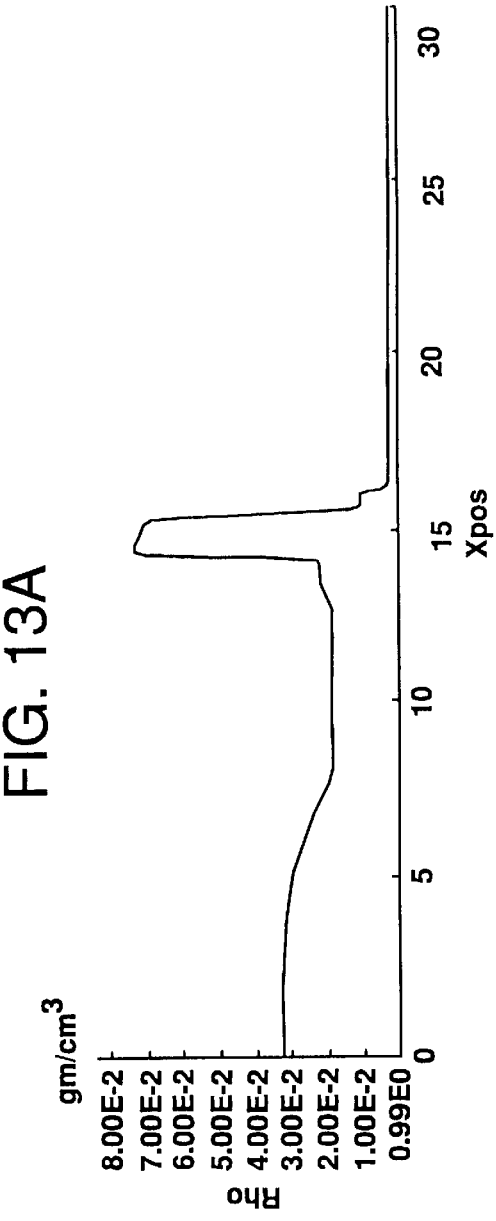
Figure 13B:
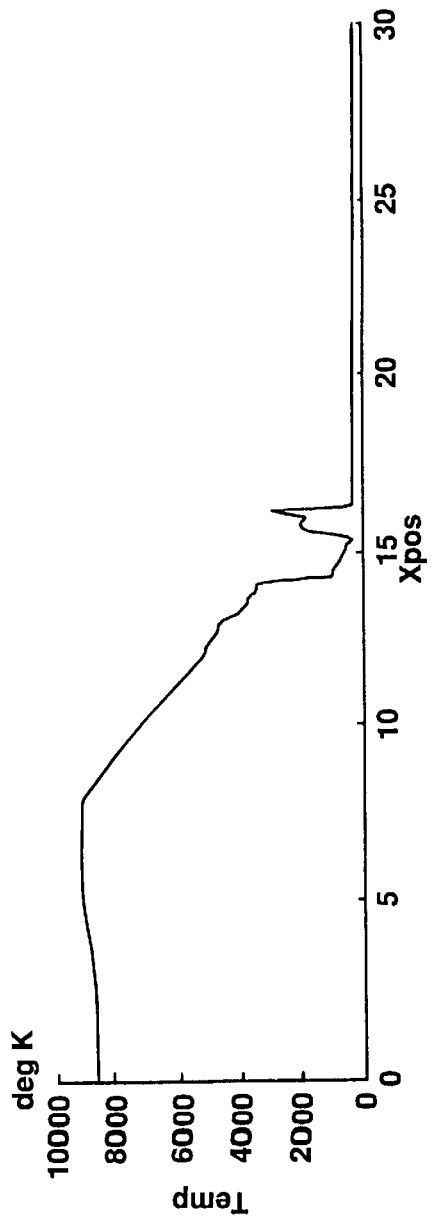
Figure 14C:
Figure 14D:
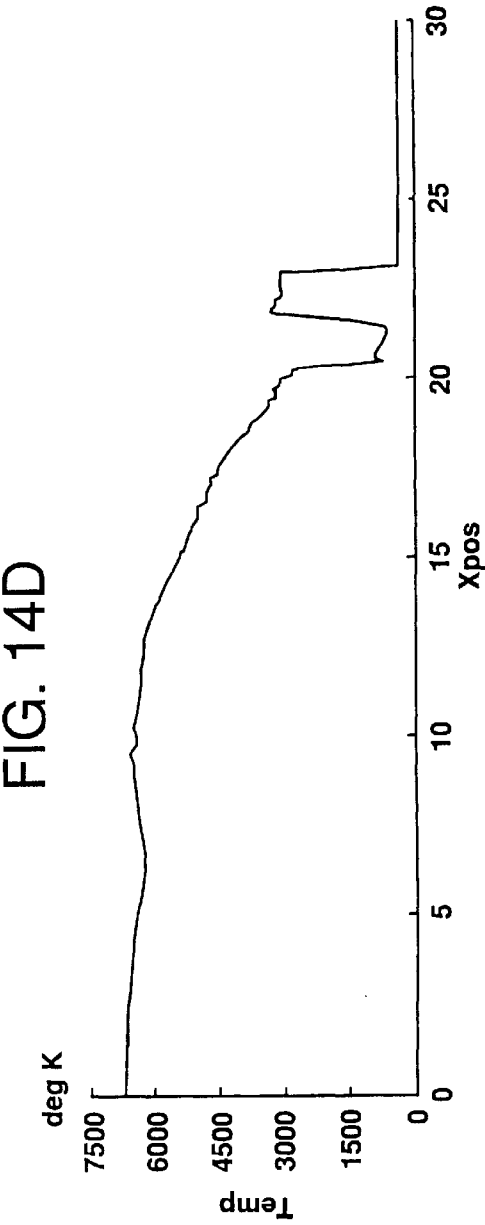
Figure 15A:
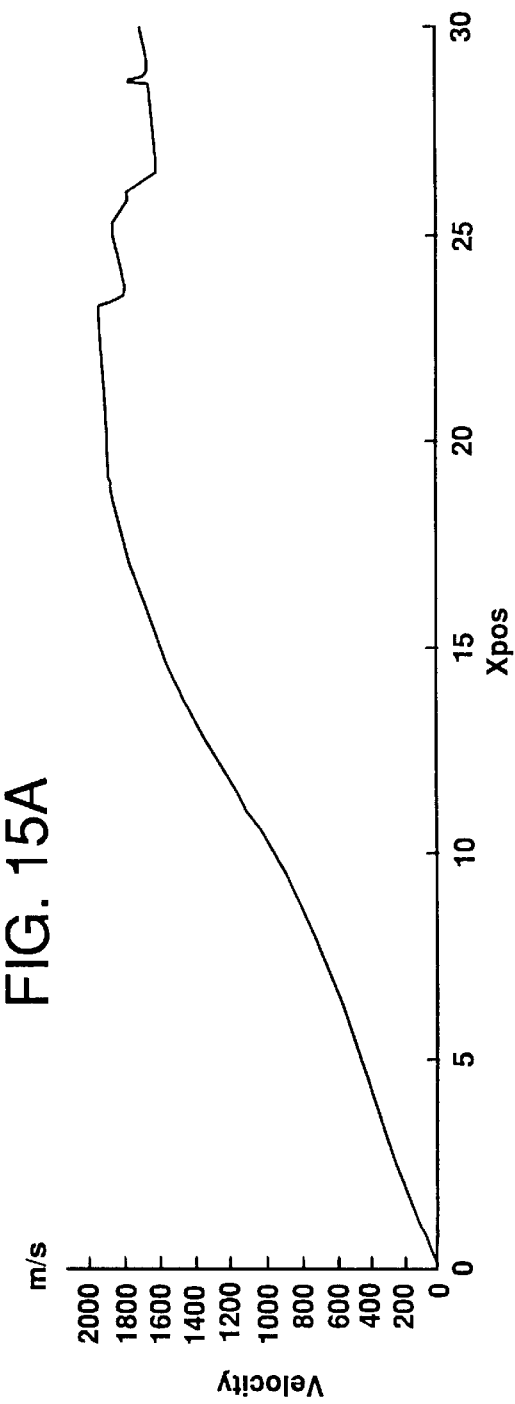
Figure 15B:
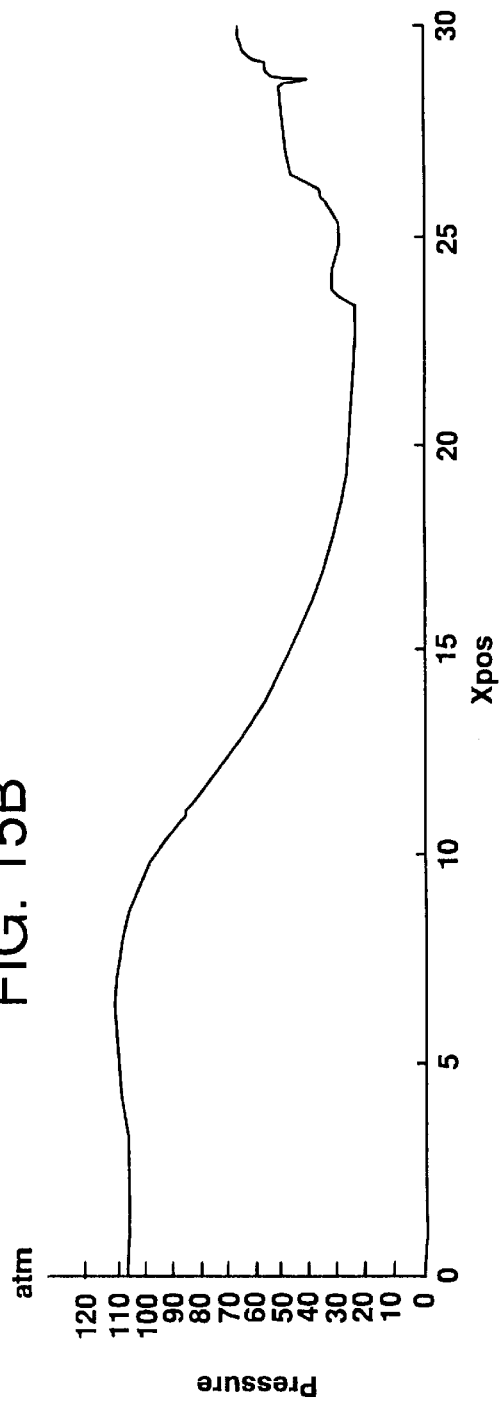

The resulting velocity time histories for 10, 50 and 100 $\mu$m droplets of aluminum and steel are shown in FIGS. 10 and 11, as functions of time and position respectively. The axial profile of the fluid variables at t=58, 100, 140 and 188 $\mu$s are shown in FIGS. 12 through 15. The 10$\mu$ particles will continue accelerating outside the barrel. The 10$\mu$ particles tend to come up to speed fairly quickly and then basically "coast" with the flow the rest of the way, since the relative velocity has become rather small and consequently also the accelerating drag. The larger particles continue to accelerate inside the barrel/nozzle, and attain roughly another 200 m/s in velocity. The barrel allows the larger particles to continue accelerating. With some optimization, relatively narrow velocity distributions are achieved. The velocities of these larger particles are greater than the velocities currently attained by only 10$\mu$ particles in existing thermal spray devices. From an energetics point of view, the kinetic energy of 30 mg of any material at 1000 m/s is only 15 J, only 1.5% of the total ohmic heating energy in the capillary discharge.

Figure 16:
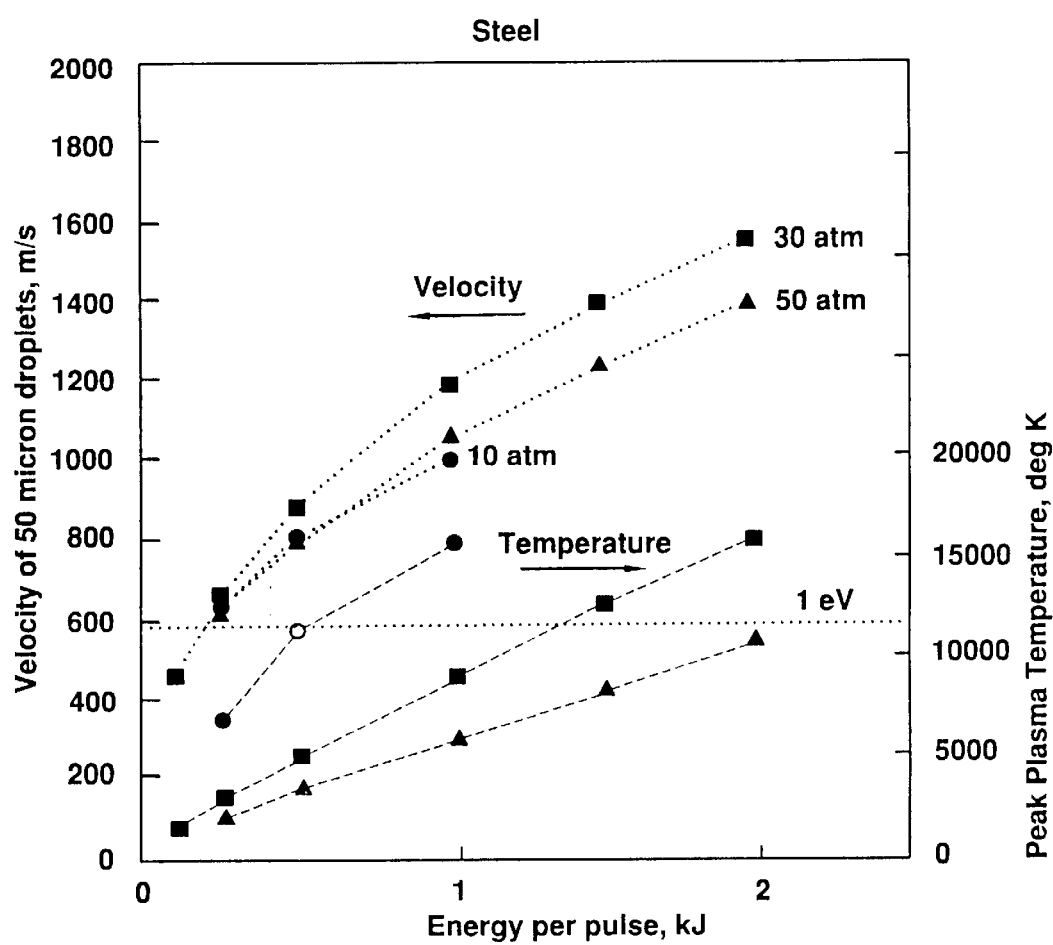
FIG. 16 is a plot of simulated velocity of 50 $\mu$m droplets of steel versus capillary discharge energy for different argon prefill pressures.
Figure 17:
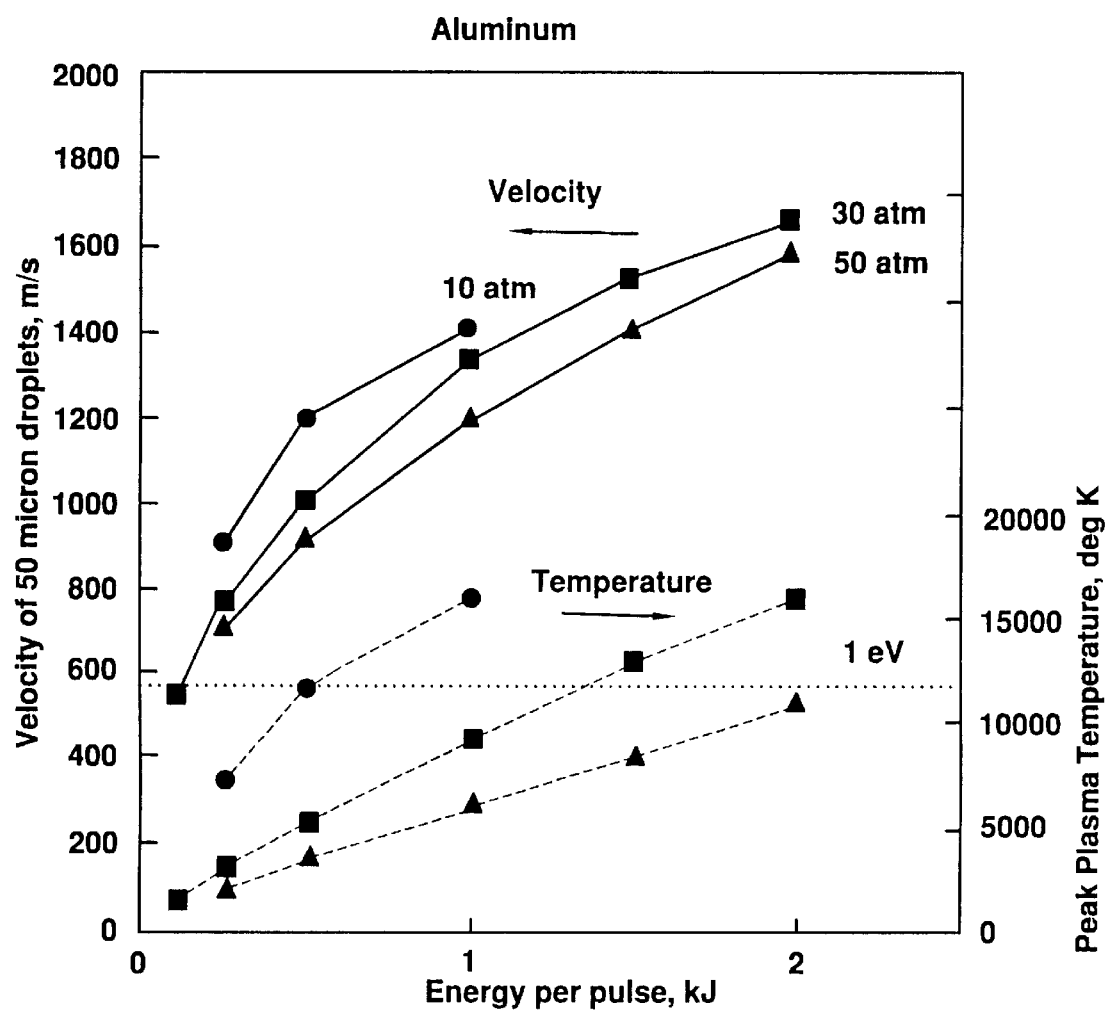
FIG. 17 is a plot of simulated velocity of 50 $\mu$m droplets of aluminum versus capillary discharge energy for different argon prefill pressures.
Figure 18:
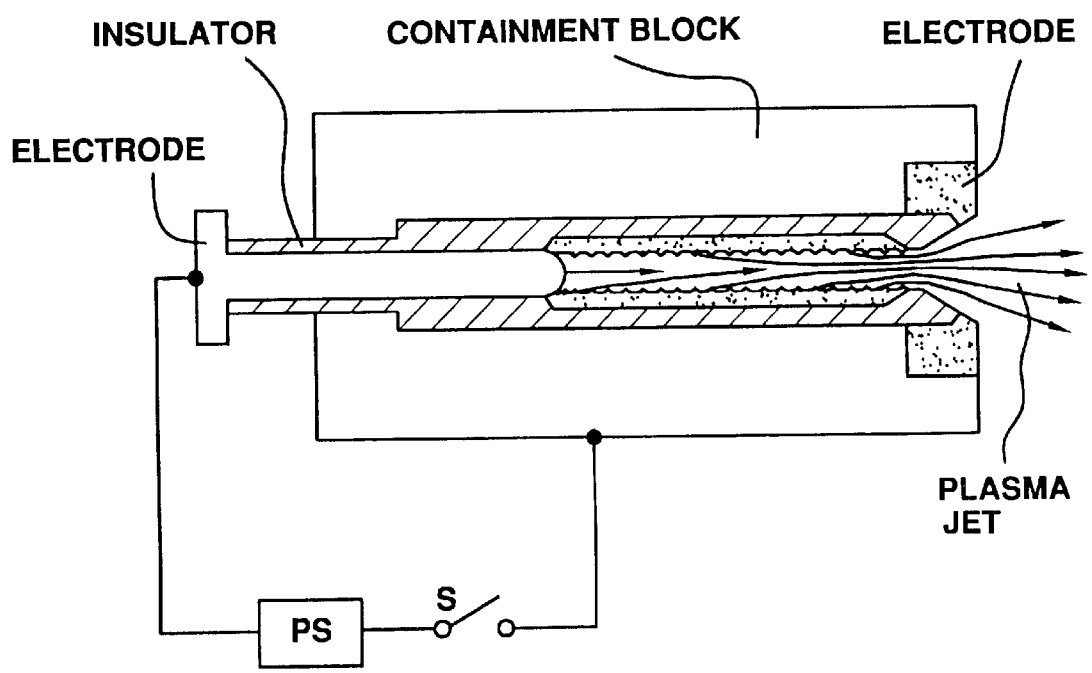
FIG. 18 is a schematic of a basic capillary discharge using wall ablation to provide working fluid mass to produce a plasma jet.

Results from a series of simulation runs are compiled in the plot in FIGS. 16 and 17, which show the velocities achieved by 50 $\mu$m sized droplets of aluminum and steel versus the capillary discharge energy for three different argon prefill pressures (10, 30, and 50 atm). The peak temperature attained in the capillary shows the approximate operational limits at 1 eV. A prefill of 30 atm is a comfortable range in which to work.

To make most efficient use of the gas in the capillary, the droplets should originate right at the exit immediately downstream of the second capillary electrode.

Note that the Pulsed Wire Arc Sprayer is readily scalable to larger and smaller (for fine work) deposition rates by adjusting the size of the capillary. The energy per pulse is typically adjusted to maintain roughly 1 kbar, 1 eV peak plasma conditions in the capillary. For a given gas operating temperature, the amount of material that can be sprayed per pulse is roughly proportional to the gas mass in the capillary. The energy per pulse also scales as the gas mass for constant peak temperature. This drives the system to higher pressure if the capillary volume remains constant. The capillary operates at pressures 2–4 times larger if SiC is used instead of BN for the capillary liner, for spraying 60–90 mg per pulse (instead of the baseline 30 mg). If the effective prefill pressure and the input electrical energy is scaled up a factor of two, the material sprayed per pulse doubles, i.e. 120–180 mg per pulse. This corresponds to about 4–6 kg/hr at a 10 Hz firing rate. Increasing the firing rate increases the spray rate proportionally. Although higher pulse rates are possible, a practical upper bound on the firing rate appears to be in the 50–100 Hz range.

While the invention has been described with reference to specific embodiments, modifications and variations of the invention may be constructed without departing from the scope of the invention, which is defined in the following claims.

TABLE 1

| Application Area | Some Specific Current Applications |
| --- | --- |
| Automotive | Pistons, valves, piston fire decks, cylinder heads, cylinder bores, fuel injectors, valve train components, crankshaft, turbochargers |
| Aerospace | Engine seals, rocket & jet engine nozzles, coatings on lightweight components, structural engine parts, control surfaces |
| Electronics | Magnetic materials, dielectrics, ceramic substrates |
| Pulp & Paper Industry | Recovery boilers, rolls, Yankee dryers, digester welds |
| Printing Industry | Engraver rolls, plate and blanket cylinders, draw rolls, analox rolls, transmission components |
| Near-Net Shape Spray Forming | Mold fabrication without machining |
| Superconductors | Magnetic shields, microwave components |
| Infrastructure Protection | Bridges and other steel and concrete structures |
| Mining & Petrochemical Industry | Pump, bearing and seal protection; drilling tools & drill-string components, valves |
| Biomedical Implants | Hydroxyapatite coatings, dental implants, hip replacement |
| Chemical Industry | Pumps, bearings and seals repair; corrosion control in pipes, pumps, vats and reactors |
| Power Generation | Corrosion & erosion in plants that burn high-sulfur coal |

TABLE 2

Major Functions of
Thermal Spray Coatings

Wear Resistance
Thermal Insulation
Corrosion Resistance
Chemical Resistance
Abradable & Abrasive Coatings
Electrical Insulation or Conductance
Medically Compatible Coatings
Dimensional Restoration
Polymer
RFI/EMI Shielding
Cosmetic Repair

TABLE 3

Comparison of thermal spray technologies.

Flame powder: Powder feedstock, aspirated into the oxygen/fuel-gas flame, is melted and carried by the flame onto the workpiece. Particle velocity is relatively low, and bond strength of deposits is low. Porosity is high and cohesive strength is low. Spray rates are usually in the 0.5 to 9 kg/h (1 to 20 lb/h) range. Surface temperatures can run quite high.
Flame wire: In flame wire spraying, the only function of the flame is to melt the material. A stream of air then disintegrates the molten material and propels it onto the workpiece. Spray rates for materials such as stainless steel are in the range of 0.5 to 9 kg/h (1 to 20 lb/h). Substrate temperatures are from 95 to 205° C. (200 to 400° F.) because of the excess energy input required for flame melting.
Wire arc: Two consumable wire electrodes are fed into the gun, where they meet and form an arc in an atomizing air stream. The air flowing across the arc/wire zone strips off the molten metal, forming a high-velocity spray stream. The process is energy efficient: all input energy is used to melt the metal. Spray rate is about 2.3 kg/h/kW (5 lb/h/kW). Substrate temperature can be low because energy input per pound of metal is only about one-eighth that of other spray methods.
Conventional plasma: Conventional plasma spraying provides free-plasma temperatures in the powder heating region of 5500° C. (10,000° F.) with argon plasma, and 4400° C. (8000° F.) with nitrogen plasma - above the melting point of any known material. To generate the plasma, an inert gas is superheated by passing it through a dc arc. Powder feedstock is introduced and is carried to the workpiece by the plasma stream. Provisions for cooling or regulation of the spray rate may be required to maintain substrate temperatures in the 95 to 205° C. (200 to 400° F.) range. Typical spray rate is 0.1 kg/h/kW (0.2 lb/h/kW).
Detonation gun: Suspended powder is fed into a 1 m (3 ft) long tube along with oxygen and fuel gas. A spark ignites the mixture and produces a controlled explosion. The high temperatures and pressures (1 MPa, 150 psi) that are generated blast the particles out of the end of the tube toward the substrate.
High-Velocity OxyFuel: In HVOF spraying, a fuel gas and oxygen are used to create a combustion flame at 2500 to 3100° C. (4500 to 5600° F.). The combustion takes place at very high chamber pressure (150 psi), exiting through a small-diameter barrel to produce a supersonic gas stream and very high particle velocities. The process results in extremely dense, well-bonded coatings, making it attractive for many corrosion-resistant applications. Either powder or wire feedstock can be sprayed, at typical rates of 2.3 to 14 kg/h (5 to 30 lb/h).
High-energy plasma: The high-energy plasma process provides significantly higher gas enthalpies and temperatures especially in the powder heating region, due to a more stable, longer arc and higher power density in the anode nozzle. The added power (two to three times that of conventional plasma) and gas flow (twice as high) provide larger, higher temperature powder injection region and reduced air entrainment. All this leads to improved powder melting, few unmelts, and high particle impact velocity.
Vacuum plasma: Vacuum plasma uses a conventional plasma torch in a chamber at pressures in the range of 10 to 15 kPa (0.1 to 0.5 atm). At low pressures the plasma is larger in diameter, longer, and has a higher velocity. The absence of oxygen and the ability to operate with higher substrate temperatures produces denser, more adherent coatings having much lower oxide contents.

TABLE 4

Conventional Wire Arc Spraying Parameters

| | |
|---|---|
| Arc Temperature | up to 5000 C. |
| Particle Velocity | 100–300 m/s |
| Spray Distance | 10–25 cm |
| Power Input | 6–80 kW |
| Air Flow Rate | up to 2500 SCFH |
| Coating Thickness | 0.05–0.5 mm (or more) |
| Consumables | wires, diameter 1.6–3.2 mm |

TABLE 5

Typical applications and materials for wire arc spray.

| Field | Material | Application |
|---|---|---|
| 1) Machine elements: | Al, Zn | rolls, shafts |
| antifretting and wear restoration clearance control | cored wires, steels, NiCr | crankshafts plungers, axes, gear boxes |
| 2) Corrosion protection | Al, Zn, AlMg | bridges and other metallic structures |
| atmosphere sea | | pipings, power boilers, offshore platforms |
| 3) Electric and electronic applications | Al, Cu, Zn, NiCr | resistors, capacitors, RF shielding on nonmetallic components, discrete conductive parts on plastic or ceramic substrates |
| 4) Other applications | Zn, Pb, Al, NiAl, NiCr steels, cored wires | casting molds; e.g., for shoe soles, shielding of X-ray rooms, bond coatings, slab marking |

TABLE 6

Advantages of pulsed wire arc operation over dc arc operation.

1) Arc initiation does not require physical touching of the electrodes
2) Mass melted per pulse is precisely metered to provide independent control and matching to a pulsed plasma jet
3) The wire arc PFN can be designed for more efficient pulsed operation than can a dc arc-welder type supply
4) Independent control of the relative timing of plasma jet and molten droplet generation
5) More efficient utilization of the wire mass (less wall losses)
6) More freedom to select pulse rate

TABLE 7

Approximate Parameters for Baseline Size of Pulsed Wire Arc Sprayer

| System Parameter | Value |
|---|---|
| Barrel/Nozzle Length | 10–20 cm |
| Capillary ID | 1.0 cm |
| Capillary length | 10 cm |
| Gas density | 0.049 gm/cm$^3$ |
| Gas mass in capillary | 308 mg |
| Peak droplet velocity | 1600–1800 m/s |
| Spray rate | 1–15 kg/hr |
| Droplet mass per pulse | 30–90 mg |
| Pulse rate | 10–50 pps |
| Fill Pressure | ~30 atm |
| Peak Pressure | ~1000 atm |
| Peak temperature | ~1 eV |
| Capillary Energy per pulse | 1–2 kJ |
| Average jet power | 10–50 kW |
| Capillary Current | 10–30 kA |
| Discharge Duration | ~100 $\mu$s |

TABLE 8

Technical Advantages of Pulsed Wire Arc Spray

Higher velocity impact (1000–2000 m/s, which is 3–6 times conventional technology)
Can achieve plasma spray or HVOF quality coatings using wire arc technology
Utilizes wire feed stock which is generally much cheaper than powder feed stock for the same material
Independent control of thermal and chemical environment, controllable working gas
Potential for true metillurgical bonding rather than just mechanical gripping of the surface
No combustible gases used making system much safer
No vacuum system needed, high purity maintained by use of only inert gases
Working fluid can be tailored for specific powders independent of energy input
Potential elimination of grit blasting prior to spraying due to higher velocity impact
Can achieve more uniform spray pattern and particle velocity distribution
Higher performance will allow use of cheaper coating materials
Very high velocity allows high quality coatings at greater spray angles of incidence
Reduced substrate heating compared to plasma spray or HVOF, allowing high performance spraying on composites and other low temperature substrates
Advanced operating modes include functionally gradient coatings
Hardware readily scaled to large or small sizes, power levels, and deposition rates
Can readily model gun performance, reducing testing times
Reactive spraying at high pressures may increase reaction rate to more interesting rates
Advanced operating modes include functionally gradient coatings using multiple wires of different composition Potential Drawbacks of Pulsed Wire Arc Spray High pressure, high temperature operation could potentially lead to relatively short lifetimes for some

TABLE 8-continued components, such as ceramic liner, electrodes, and barrels
Seals for wire feed system may be high maintenance
High voltage operation - but not significantly different than high power plasma spray
Hand held units appear unlikely at the present time

We claim:

1. Apparatus for coating a substrate, comprising an electrically insulating capillary tube having an inlet and exit, a fluid supply connected to the inlet, electrodes in the capillary tube near the inlet and exit, an electrode power supply connected to the electrodes, wires forming a gap mounted outside the capillary tube near the exit, a gap power supply connected to the wires for creating an arc across the gap for heating and melting surfaces of the wires, a controller connected to the electrode power supply and to the gap power supply for igniting an arc across the electrodes and creating a plasma in the capillary tube and for igniting an arc across the gap for melting material on surfaces of the wires, wherein the plasma strips and atomizes the melted material into particles and accelerates the particles to the substrate.

2. The apparatus of claim 1, wherein the electrodes in the capillary tube comprise an anode at the exit and a cathode at the inlet.

3. The apparatus of claim 2, wherein the cathode comprises a fluid supply tube mounted in the inlet of the capillary tube.

4. The apparatus of claim 1, wherein the fluid supply comprises a liquid feed.

5. The apparatus of claim 1, further comprising a nozzle mounted near the exit of the capillary tube.

6. The apparatus of claim 5, further comprising first and second bushings connected to the nozzle near the exit of the capillary tube, and wherein the wires extend from outside the nozzle through the bushings into the nozzle for forming the gap within the nozzle aligned with the exit of the capillary tube.

7. The apparatus of claim 5, wherein the nozzle has a cylindrical wall.

8. The apparatus of claim 6, wherein the nozzle has divergent walls.

9. The apparatus of claim 8, wherein the walls diverge at an angle of from about 5° to 30°.

10. The apparatus of claim 6, wherein the nozzle has an inner wall, and wherein the wires are almost flush with the inner wall.

11. The apparatus of claim 1, wherein the controller provides the igniting of the arc across the electrodes and the igniting of the arc across the gap.

12. The apparatus of claim 1, wherein the capillary tube has first and second inlets at opposite ends, wherein the fluid supply is connected to the first and second inlets, wherein the electrodes comprise first and second inlet electrodes near the first and second inlets, respectively, wherein the exit is a center exit in a center of the tube, wherein the electrodes further comprise a center electrode at the center of the tube near the exit, and wherein the controller pulsed arcs across the first inlet electrode and the center electrode and between the second inlet electrode and the center electrode.

13. The apparatus of claim 12, further comprising a nozzle mounted at the center exit, and wherein the wires extend through the nozzle for forming the gap within the nozzle near the exit.

14. The apparatus of claim 13, wherein walls of the nozzle are straight or divergent.

15. The apparatus of claim 1, wherein the electrode power supply is a pulsed supply.

16. The apparatus of claim 1, wherein at least one of the wires is consumable and at least one other of the wires is non-consumable.

17. The apparatus of claim 12, wherein the electrode power supply is a pulsed supply.

18. The apparatus of claim 13, wherein at least one of the wires is consumable and at least one other of the wires is non-consumable.

19. A coating method, comprising feeding fluid into an inlet of a plasma generator tube, forming a gap with wires at an exit of the plasma generator tube, expanding the fluid within the plasma generator tube, forming pulsed arcs between electrodes in the plasma generator tube and in the gap between the wires, heating and energizing the fluid in the plasma generator tube into a plasma, directing the plasma through the exit and through the gap between the wires, melting material from the wires with the arc in the gap between the wires, impacting the melted material from the wires with the plasma and forming particles from the melted material from the wires, and accelerating the particles with the plasma toward a substrate and impacting the substrate with the particles and coating the substrate with the particles.

20. The method of claim 19, wherein the feeding fluid comprises feeding a liquid, and wherein the expanding of the fluid comprises gasifying and forming droplets of the liquid in the plasma generator.

21. The method of claim 19, wherein the feeding of the fluid comprises intermittently feeding fluid.

22. The method of claim 19, wherein the feeding comprises continuously feeding liquid.

23. The method of claim 19, wherein the feeding further comprises feeding fluid through an electrode.

24. The method of claim 19, wherein the directing further comprises directing the plasma through a divergent nozzle.

25. The method of claim 19, wherein the feeding comprises feeding fluid into first and second opposite inlets of a plasma generator which has a center exit, wherein the forming of pulsed arcs further comprises forming arcs in the plasma generator between a first electrode and the first inlet and a center electrode, and between a second electrode at the second inlet and the center electrode, and wherein the directing of plasma comprises directing plasma through the center exit.

26. Coating apparatus comprising a plasma generator having an exit, a melt former near the exit, a power supply connected to the plasma generator for generating a plasma, and a power supply connected to the melt former for forming a melt near the exit, whereby plasma directed from the exit atomizes melted material into particles and accelerates the particles toward a substrate for coating the substrate.

27. The coating apparatus of claim 26, wherein the melt former comprises conductors providing a gap forming an arc near the exit and melting material from the conductors for atomizing and accelerating by the plasma.

28. The coating apparatus of claim 26, wherein the plasma generator comprises a tube having a fluid inlet and electrodes near the inlet and near the exit for providing an arc and generating the plasma.

29. The coating apparatus of claim 28, further comprising a pressurized liquid supply connected to the inlet.

30. The coating apparatus of claim 28, further comprising a controller connected to the power supplies for pulsing the power supplies and pulsing the arcs and the plasma.

31. The coating apparatus of claim 30, wherein the plasma generator tube is elongated, wherein the exit comprises a center exit, wherein the inlet comprises first and second opposite inlets, and wherein the electrodes comprise first and second electrodes near the first and second inlet respectively and a center electrode near the center exit.

32. The coating apparatus of claim 31, further comprising a divergent nozzle extending outward from the exit past the conductors.

33. The coating apparatus of claim 31, wherein the melt former comprises fourth and fifth electrodes spaced by a gap and wherein the power supply connected to the melt former is connected to the fourth and fifth electrodes for supporting an arc in the gap between the fourth and fifth electrodes for heating the fourth and fifth electrodes and for melting material from at least one of the fourth and fifth electrodes in the plasma from the exits of the plasma generator.

34. The coating apparatus of claim 33, wherein the fifth electrode is a consumable electrode and the fourth electrode is a non-consumable electrode and wherein the material melts from the fifth electrode.

35. The coating apparatus of claim 34, wherein the fourth electrode is electrically connected to the center electrode.

36. The coating apparatus of claim 28, further comprising a pressurized supply of working fluid connected to the inlet and working fluid in the pressurized supply selected from a group of working fluids consisting of liquid argon, liquid nitrogen, water and liquid hydrocarbon fuel.

37. The coating apparatus of claim 26, wherein the melt former comprises first and second electrodes spaced by a gap and wherein the melt former-connected power supply is connected to the first and second electrodes for supporting an arc in the gap between the first and second electrodes for heating the electrodes and for melting material from one of the electrodes in the plasma from the exits of the plasma generator.

38. The coating apparatus of claim 37, wherein the first electrode is a consumable electrode and the second electrode is a non-consumable electrode.

39. The apparatus of claim 26, wherein the power supply is a pulsed supply.

40. Apparatus for performing a coating method, comprising means for feeding fluid into an inlet of a plasma generator tube, means for forming a gap with wires at an exit of the plasma generator tube, means for expanding the fluid within the plasma generator tube, means for forming pulsed arcs between electrodes in the plasma generator tube, and means for forming an arc in the gap between the wires, means for heating and energizing the fluid in the plasma generator tube into a plasma, means for directing the plasma through the exit and through the gap between the wires, means for melting material from the wires with the arc in the gap between the wires, means for impacting the melted material from the wires with the plasma and forming particles from the melted material from the wires, and means for accelerating the particles with the plasma toward a substrate and impacting the substrate with the particles and coating the substrate with the particles.

41. The apparatus of claim 40, wherein the means for feeding fluid comprises means for feeding a liquid, and wherein the means for expanding of the fluid comprises means for gasifying and forming droplets of the liquid in the plasma generator.

42. The apparatus of claim 40, wherein the means for feeding fluid comprises means for intermittently feeding fluid.

43. The apparatus of claim 40, wherein the means for feeding comprises means for continuously feeding liquid.

44. The apparatus of claim 40, wherein the means for feeding further comprises means for feeding fluid through an electrode.

45. The apparatus of claim 40, wherein the means for directing further comprises means for directing the plasma through a divergent nozzle.

46. The apparatus of claim 40, wherein the means for feeding comprises means for feeding fluid into first and second opposite inlets of a plasma generator which has a center exit, wherein the means for forming of pulsed arcs further comprises means for forming pulsed arcs in the plasma generator between a first electrode at the first inlet and a center electrode, and between a second electrode at the second inlet and the center electrode, and wherein the means for directing plasma comprises means for directing plasma through the center exit.

\* \* \* \* \*